(12) United States Patent
Nagura

(10) Patent No.: US 11,221,238 B2
(45) Date of Patent: Jan. 11, 2022

(54) OPTICAL ENCODER AND DRIVE CONTROL DEVICE COMPRISING A LIGHT RECEIVING ELEMENT TO RECEIVE A FIRST INTERFERENCE FRINGE FORMED BY A FIRST PERIODIC PATTERN AND A SECOND DIFFRACTED LIGHT FROM A SECOND PERIODIC PATTERN TOWARD THE FIRST PERIODIC PATTERN

(71) Applicant: CANON KABUSHIKI KAISHA, Tokyo (JP)

(72) Inventor: Chihiro Nagura, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/919,414

(22) Filed: Jul. 2, 2020

(65) Prior Publication Data
US 2021/0003425 A1 Jan. 7, 2021

(30) Foreign Application Priority Data

Jul. 5, 2019 (JP) .............................. JP2019-126261
Jun. 23, 2020 (JP) .............................. JP2020-107602

(51) Int. Cl.
*G01D 5/347* (2006.01)
*G01D 5/26* (2006.01)

(52) U.S. Cl.
CPC ......... *G01D 5/34715* (2013.01); *G01D 5/266* (2013.01); *G01D 5/3473* (2013.01)

(58) Field of Classification Search
CPC .... G01D 5/3473; G01D 5/38; G01D 5/34715; G01D 5/34792
(Continued)

(56) References Cited

U.S. PATENT DOCUMENTS 5,073,710 A   12/1991  Takagi
5,956,140 A *  9/1999  Ishizuka ................ G01D 5/38
                                                356/494

(Continued)

FOREIGN PATENT DOCUMENTS

DE        19908328 A1    8/2000
JP        H03113316 A    5/1991

OTHER PUBLICATIONS

Office Action issued in German Appln. No. 102020117600.7 dated Apr. 12, 2021.
(Continued)

*Primary Examiner* — Que Tan Le
(74) *Attorney, Agent, or Firm* — Rossi, Kimms & McDowell LLP

(57) ABSTRACT

In order to provide an optical encoder with high resolution, the optical encoder includes: a rotary scale provided with a grating pattern having a first radial pattern and a plurality of concentric circular patterns disposed at predetermined intervals; and a light receiving element which detects a first interference fringe formed by the first pattern having a first period in the circumferential direction, a second interference fringe which is diffracted in a direction of the first interference fringe by a grating pattern having a second period in the circumferential direction disposed at a different radial position so that the second interference fringe has a period closer to the first period than the second period.

11 Claims, 14 Drawing Sheets

(58) Field of Classification Search
USPC .......................................... 250/231.13, 239
See application file for complete search history.

(56) References Cited

U.S. PATENT DOCUMENTS

| | | |
|---|---|---|
| 6,429,940 B1 | 8/2002 | Willhelm |
| 2008/0087805 A1 | 4/2008 | Kress |
| 2011/0069390 A1 | 3/2011 | Koshida |
| 2013/0076289 A1 | 3/2013 | Yamaguchi |
| 2015/0076332 A1 | 3/2015 | Nagura |
| 2017/0023383 A1 | 1/2017 | Jordil |
| 2019/0178687 A1 | 6/2019 | Horiguchi |

OTHER PUBLICATIONS

English translation of Office Action issued in German Appln. No. 102020117600.7 dated Apr. 12, 2021, previously cited in IDS filed May 20, 2021.
Combined Search and Examination Report Under Sections 17 and 18(3) issued in GB Application No. 2010266.1 dated Jan. 7, 2021.
Examination Report and Search report issued in Great Britain Appln. No. 2010266.1 mailed on Oct. 7, 2021.

\* cited by examiner

OPTICAL ENCODER AND DRIVE CONTROL DEVICE COMPRISING A LIGHT RECEIVING ELEMENT TO RECEIVE A FIRST INTERFERENCE FRINGE FORMED BY A FIRST PERIODIC PATTERN AND A SECOND DIFFRACTED LIGHT FROM A SECOND PERIODIC PATTERN TOWARD THE FIRST PERIODIC PATTERN

BACKGROUND OF THE INVENTION

Field of the Invention

The present invention relates to an optical encoder and the like.

Description of the Related Art

Conventionally, a rotary encoder is used for angle measurement of a machine tool, a factory automation (FA) device, and the like. As disclosed in, for example, Japanese Patent Laid-Open No. H3-113316, an optical encoder is caused to have a light condensing effect in a radial direction, and thus light receiving efficiency can be improved.

In a rotary scale, a spatial frequency in a moving direction changes depending on a detection radius to be read. In particular, when the detection radius is small, a change in the spatial frequency with respect to a deviation in diameter becomes more sensitive.

Even if the deviation from a reading center diameter is large and a light beam from a grating pattern in a region that cannot substantially contribute to detection signals is condensed on a light receiving surface, signal efficiency cannot be improved, and conversely, noise components may be increased.

An object of the present invention is to provide a high-resolution optical encoder with low noise even if a diameter is downsized.

SUMMARY OF THE INVENTION

An optical encoder according to one aspect of the present invention is characterized by including: a rotary scale that rotates about a predetermined axis serving as a rotation center and that includes a grating pattern having a first pattern and a second pattern both extending in a radial direction from the rotation center, wherein the first pattern is disposed in a first radial region and has a first period P1 in a circumferential direction, and the second pattern is disposed in a radial region different from the first radial region and has a second period P2 different from the first period in a circumferential direction;

a light source which irradiates the grating pattern with light at a predetermined angle; and a light receiving element which detects interference fringes of the grating pattern irradiated with the light from the light source, wherein the light receiving element is disposed to receive a first interference fringe having a period Q1 formed by the first pattern and to receive a second interference fringe having a period Q2 which is diffracted by the second pattern and formed in a direction of the first interference fringe, and is configured to satisfy a relation of $P2 \times Q1/P1 < Q2 < P1 \times Q1/P2$ or $P2 \times Q1/P1 > Q2 > P1 \times Q1/P2$.

Further features of the present invention will become apparent from the following description of exemplary embodiments with reference to the attached drawings.

DESCRIPTION OF THE EMBODIMENTS

Hereinafter, embodiments of the present invention will be described with reference to the drawings.

First Embodiment

Figure 1:
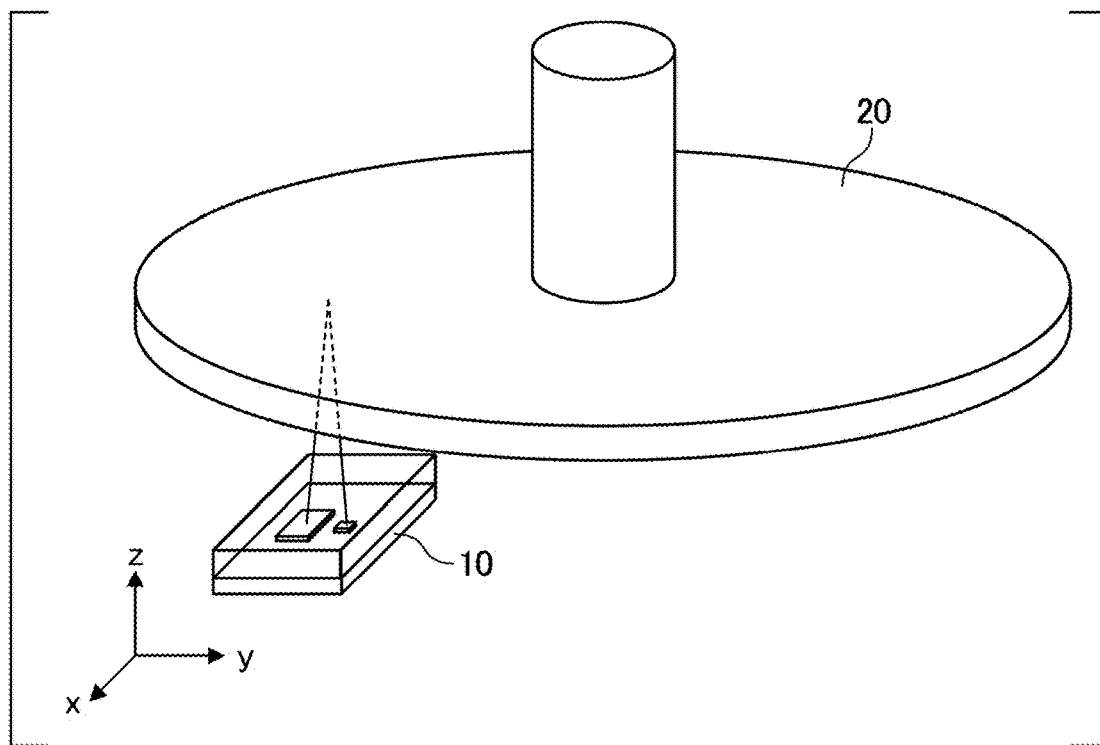
FIG. 1 is a diagram showing a configuration of an optical encoder which is a first embodiment of the present invention.
Figure 2:
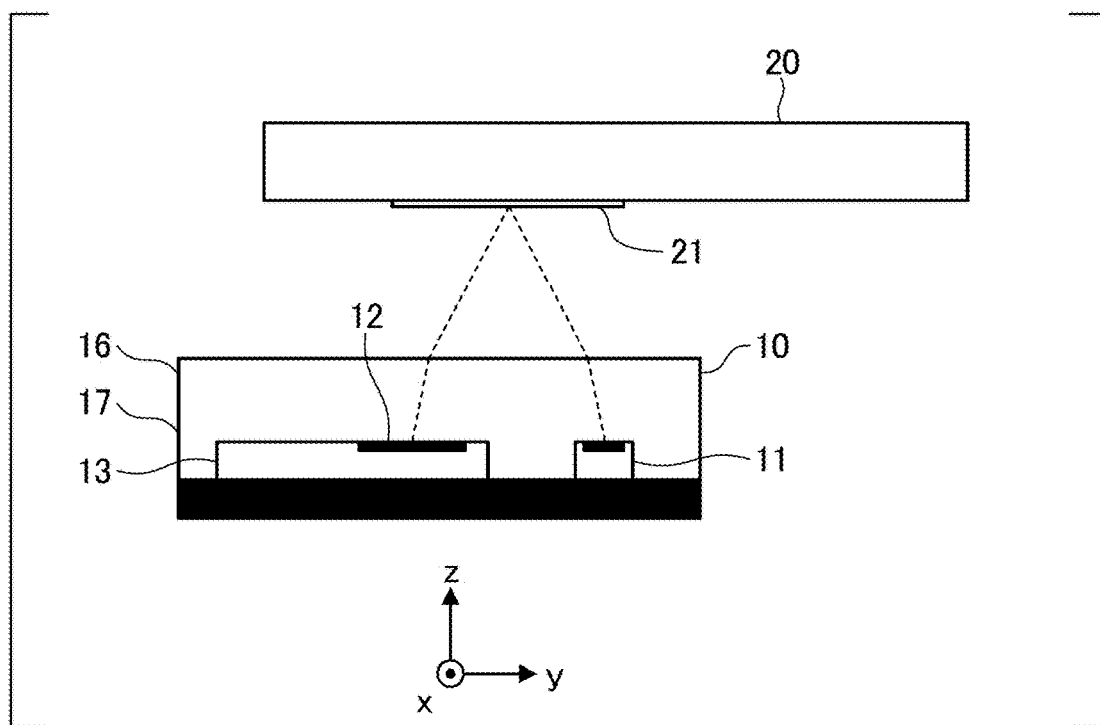
FIG. 2 is a diagram showing a cross-sectional structure of the optical encoder according to the first embodiment.

FIG. 1 shows a configuration of an optical encoder (hereinafter, simply referred to as an encoder) that is a first embodiment of the present invention. FIG. 2 shows a cross-sectional structure of the optical encoder according to the present embodiment viewed from an X axis side in FIG. 1.

The encoder has a sensor unit 10 which is attached to a fixed part of a measuring device (not shown), and a (rotary) scale 20 which is attached to a movable part of the measuring device and is rotatable around a predetermined axis serving as a rotation center with respect to the sensor unit 10. Also, the scale 20 may be attached to the fixed part of the device, and the sensor unit 10 may be attached to the movable part.

That is, it is only necessary that the sensor unit 10 and the scale 20 be movable relative to each other. In the following description, a moving direction of the scale 20 with respect to the sensor unit 10 (an X direction in FIG. 2), that is, a direction of relative movement between the scale 20 and the sensor unit 10, is referred to as a position detecting direction.

The sensor unit 10 is a light receiving and emitting integrated type sensor unit on which a light emitting element 11 configured of an LED and the like and a light receiving IC 13 having a light receiving element array 12 are mounted in the same package. The light receiving element array 12 is configured with a plurality of light receiving elements for detecting a light intensity distribution reflected by a grating pattern provided on the scale 20 arranged in the position detecting direction (the X direction, that is, a circumferential direction of the scale or a direction orthogonal to a radius thereof) (see FIG. 4).

Figure 3:
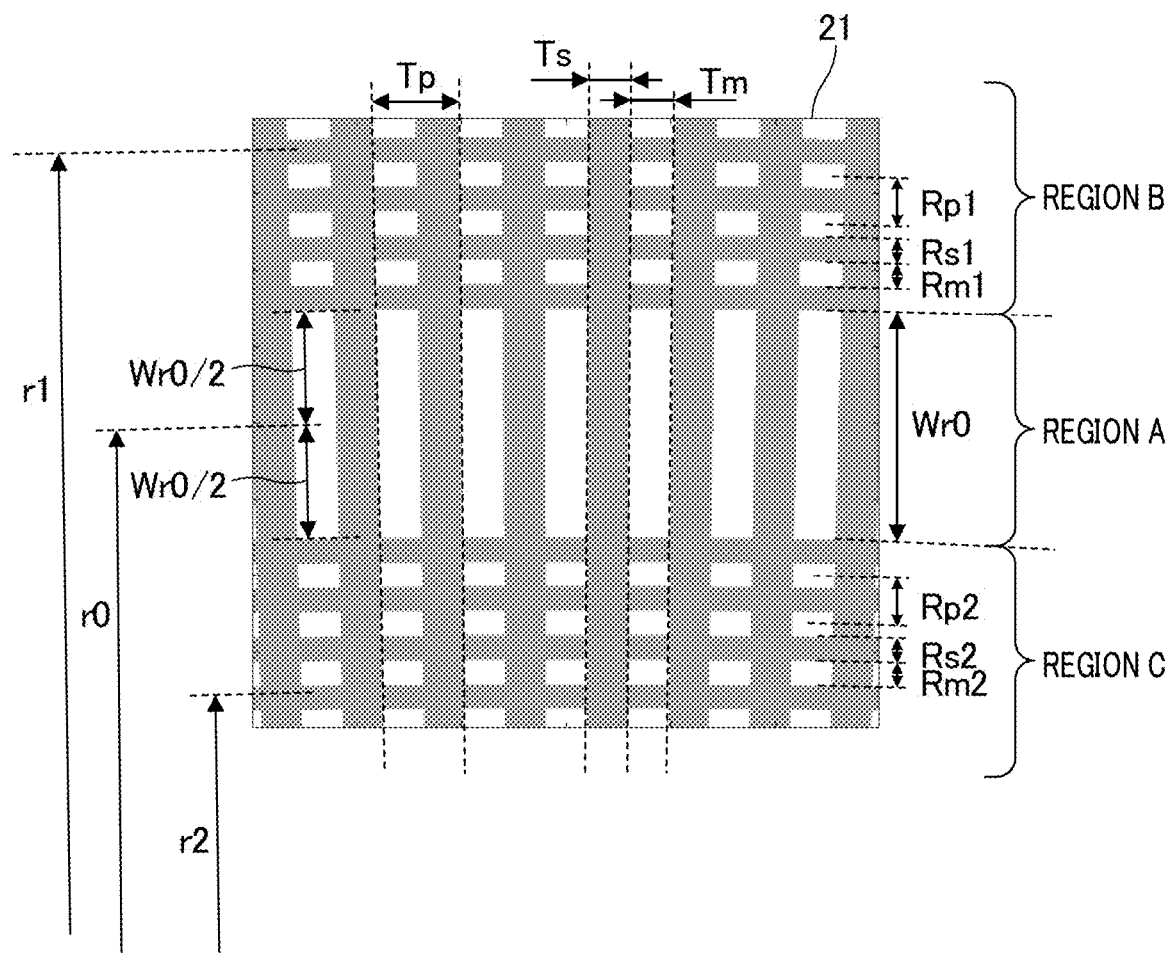
FIG. 3 is a diagram showing a grating pattern according to the first embodiment.

On the other hand, the scale 20 is provided with a grating pattern 21 which is formed as a reflective diffraction grating by reflective portions and non-reflective portions alternately arranged in the circumferential direction. FIG. 3 is a diagram showing an example of the grating pattern 21, in which gray portions are the non-reflective portions and white portions are the reflective portions. Also, although a reflective scale is used in the present embodiment, the present invention is not limited thereto, and it may be a transmissive type. In that case, the gray portions may be non-transmissive portions and the white portions may be transmissive portions.

A region (a region A or a first radial region) having a width Wr0 in a radial direction thereof is provided around a reading center radius r0 (a first radial position). Further, a plurality of slit columns (a first pattern or a first periodic pattern) formed by the reflective portions and the non-reflective portions that are alternately arranged at predetermined angles Tp/2 with respect to the rotation center of the rotary scale are provided in the circumferential direction.

Each slit column has a radial shape extending in the radial direction from the rotation center of the rotary scale and is disposed at every predetermined angle. The first pattern has a first period P1.

A region having a radius larger than r0+Wr0/2 includes a region B (a third radial region) including a predetermined radius r1 (a third radial position).

The region B has concentric circular patterns configured of the non-reflective portions and the reflective portions disposed periodically at predetermined intervals in the radial direction. A plurality of concentric circular patterns are disposed at predetermined intervals from the rotation center of the rotary scale and extend along the circumferential direction of the rotation center. Further, slit columns (a second pattern or a second periodic pattern) formed by the reflective portions and the non-reflective portions arranged alternately in the circumferential direction are provided, and a period P2 of the second pattern in the region B is longer than the period P1 of the first pattern.

Also, the grating pattern is formed by the second pattern and the concentric circular patterns. A distance between centers of radially adjacent gratings in the radial direction is Rp1, and a width of the reflective portion and a width of the non-reflective portion in the radial direction are Rm1 and Rs1, respectively.

A region having a radius smaller than r0-Wr0/2 includes a region C (a second radial region) including a predetermined radius r2 (a second radial position), and the region has concentric circular patterns formed by the non-reflective portions and the reflective portions disposed periodically at predetermined intervals in the radial direction. A plurality of concentric circular patterns are disposed at predetermined intervals from the rotation center of the rotary scale and extend in the circumferential direction of the rotation center.

In addition, the slit columns (second (periodic) pattern) formed by the reflective portions and the non-reflective portions that are alternately arranged in the circumferential direction are provided, and the grating pattern is formed by the second pattern and the concentric circular patterns. The period P2 of the second pattern in the region C is shorter than the period P1 of the first pattern.

A distance between centers of radially adjacent grating patterns in the radial direction is Rp2, and a width of the reflective portion and a width of the non-reflective portion in the radial direction are Rm2 and Rs2, respectively.

In each of the regions A, B, and C, the width of the reflective portion in the circumferential direction is Tm, and the width of the non-reflective portion is Ts.

The following parameters are used in the present embodiment.

$Wr0 = 0.3$ mm
$Tp = 2\pi/1885 = 0.0033333$ rad
$Ts = Tp/2$
$Tm = Tp/2$
$Rp1 = 6$ μm
$Rs1 = Rp1/2$
$Rm1 = Rp1/2$
$Rp2 = 6$ μm
$Rs2 = Rp2/2$
$Rm2 = Rp2/2$
$r0 = 6$ mm
$r1 = 6.2$ mm
$r2 = 5.8$ mm A center wavelength of a light source is defined as $\lambda$, and a distance from a radial position at which a light emitting point of the light emitting element 11 is disposed to the reading center radius r0 (see FIG. 7) is defined as dr0. In the present embodiment, $\lambda = 650$ nm, and
$dr0 = 1$ mm
are set.

Also, the light emitting element 11 emits light at a predetermined angle with respect to the grating pattern.

Figure 4:
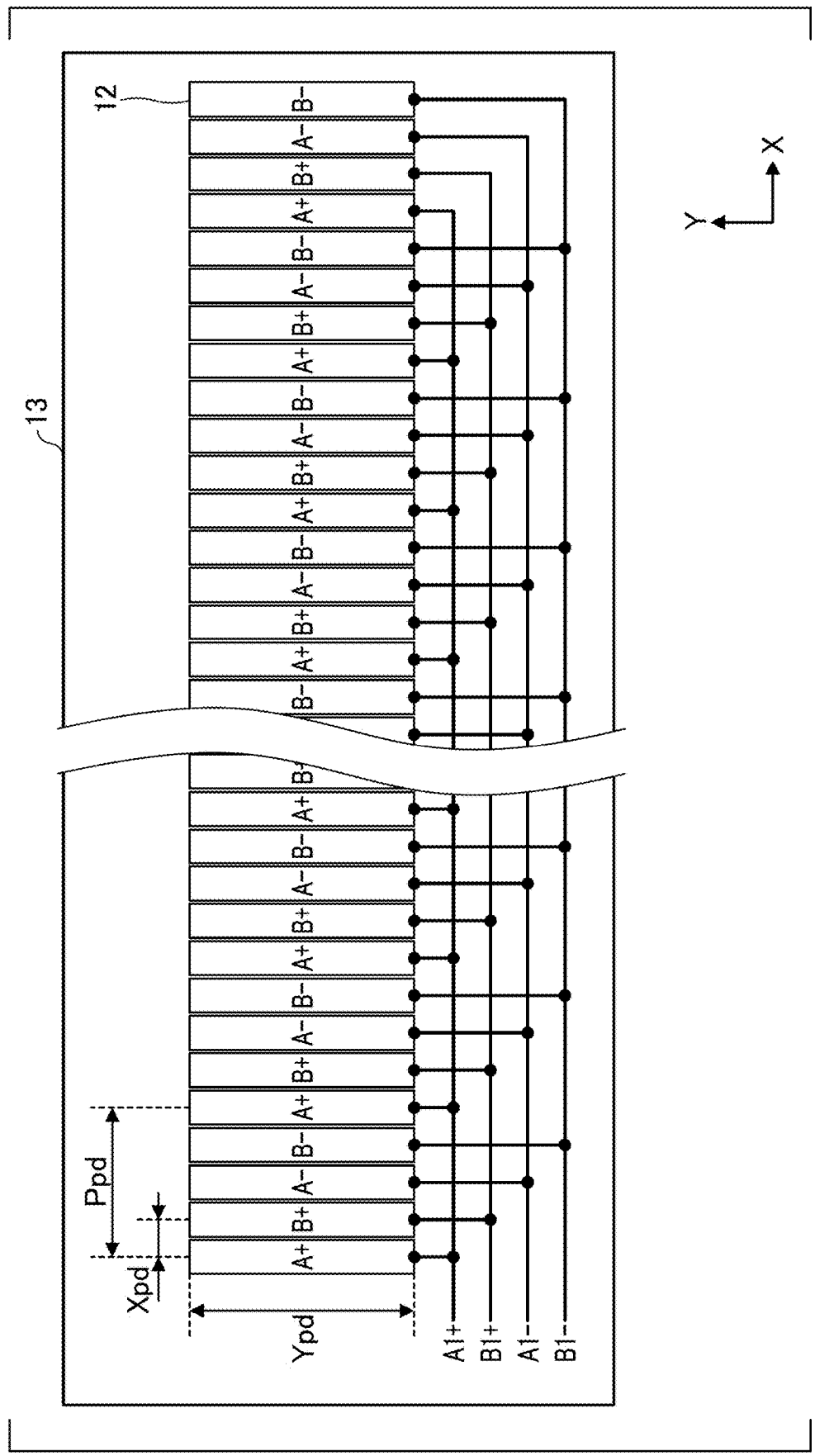
FIG. 4 is a diagram showing an arrangement of light receiving elements of the first embodiment.

FIG. 4 shows the light receiving element array 12 as a light receiving element that detects interference fringes of the grating pattern irradiated with the light from the light source. In the present embodiment, the light receiving element array 12 is configured with 160 light receiving elements arranged in a row in the position detecting direction.

A distance (an adjacent element pitch) Xpd between centers of two light receiving elements adjacent to each other in the position detecting direction is 10 μm. Also, a size (width) Ypd of each light receiving element in a direction (a Y direction) orthogonal to the position detecting direction is 1,000 sm.

The 160 light receiving elements are cyclically allocated to an A(+) phase, a B(+) phase, an A(−) phase and a B(−) phase in this order and 40 (2 or more) light receiving elements allocated to each of these four phases form one light receiving element group. That is, in the present embodiment, four light receiving element groups each including 40 light receiving elements are provided.

The 40 light receiving elements constituting each light receiving element group are electrically connected to each other, and their outputs (currents) are added together and input to an IV (current-voltage) conversion amplifier (not shown) provided for each phase at the latter part. A distance (an in-group element pitch) Ppd between centers of two light receiving elements closest to each other in the position detecting direction among the 40 light receiving elements constituting the same light receiving element group arranged at every fourth position is 40 (1×4) μm.

An output of the IV amplifier for each phase is a voltage signal (a sine wave signal) of which a value changes sinusoidally in response to the movement of the scale 20. Outputs of the four IV amplifiers provided for the four phases correspond to signal phases of 0, 90, 180, and 270 degrees, respectively, and are converted into position information via arithmetic processing.

Figure 5:
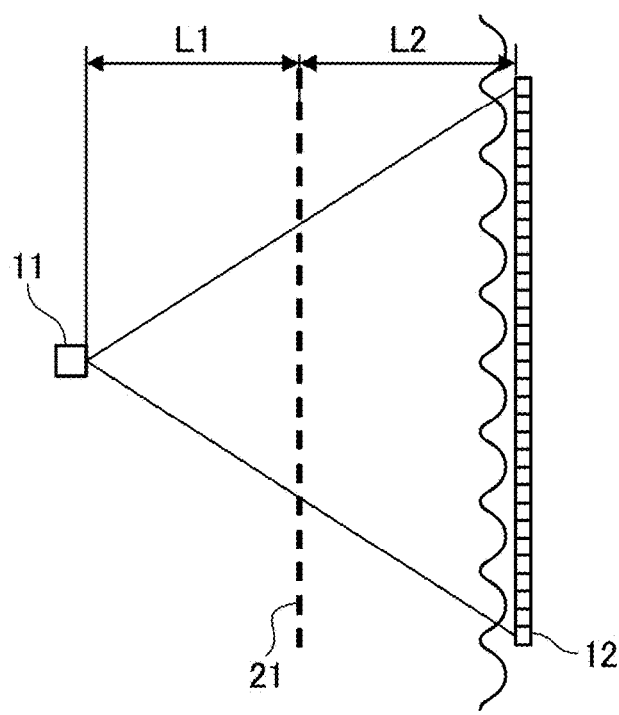
FIG. 5 is a developed view of an optical path of the encoder according to the first embodiment.

FIG. 5 is a diagram showing an optical path of the encoder according to the present embodiment in a developed state, that is, in which reflection is developed like transmission. A distance L1 from the light emitting element 11 to the grating pattern 21 is set in the range of 2 mm±0.3 mm. A distance L2 from the grating pattern 21 to the light receiving element array 12 is set equal to (or within a range that can be regarded as equal to) L1. In the present embodiment, L1=L2=2 mm.

Also, L1 and L2 correspond to effective optical path lengths, and the effective optical path length is a value obtained by dividing a physical length by a refractive index.

A divergent light beam emitted from an LED serving as the light emitting element 11 enters the grating pattern 21. 0th-order light, +1st-order diffracted light, and −1st-order diffracted light diffracted and reflected by the grating pattern 21 interfere with each other on the light receiving element array 12, whereby an interference fringe having a light intensity distribution of a period P is formed.

Figure 6:
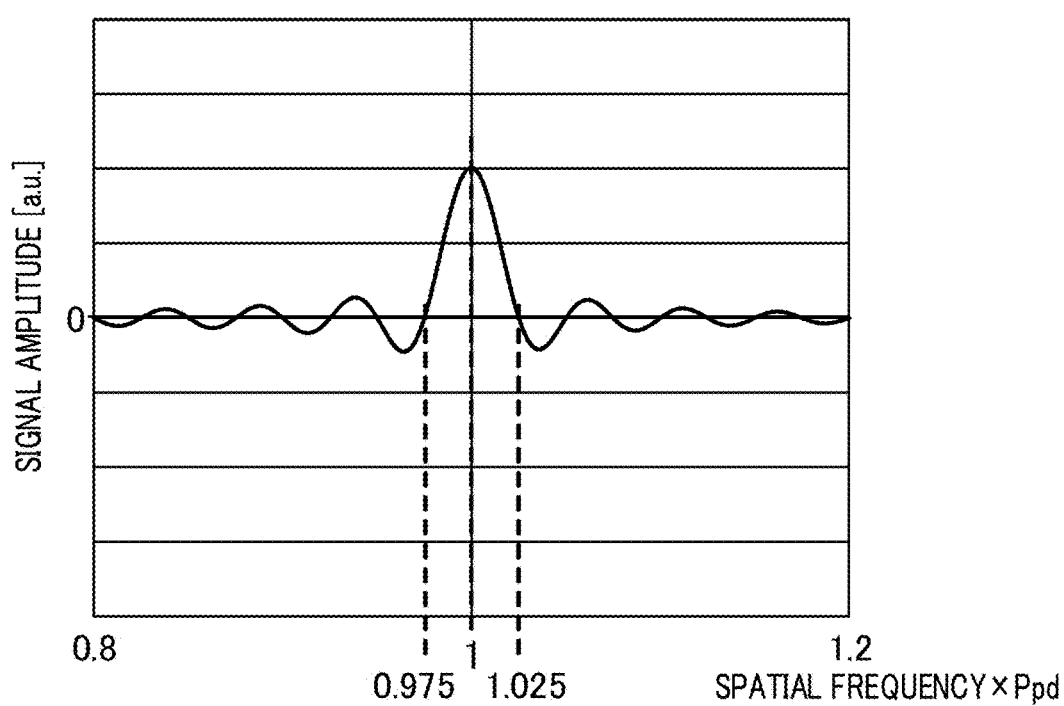
FIG. 6 is a diagram showing a spatial frequency response characteristic of a detection unit according to the first embodiment.

FIG. 6 shows response characteristics of an output signal amplitude of each of the four IV amplifiers, which are provided for the four phases, with respect to a spatial frequency P of interference fringes on the light receiving element array 12.

The spatial frequency on a horizontal axis is normalized by a reciprocal 1/Ppd of the in-group element pitch of the light receiving element array 12, and a response of the signal amplitude has a peak at 1. In the present embodiment, the in-group element pitch Ppd of the light receiving element array 12 serving as a detection grating corresponds to a period P0 at which detection sensitivity reaches a peak.

If the period P of the interference fringes deviates from Ppd, the output signal amplitude attenuates, and in the case in which the number of interference fringes to be read is N (40 in the present embodiment), when Ppd/P deviates up to (N+1)/N=1.025 or (N−1)/N=0.975, the signal disappears.

That is, the light receiving element array 12 has a detection period corresponding to a period of a first interference fringe, and can detect the first interference fringe having a predetermined period range including P0 as a first period, but is substantially incapable of detecting interference fringes outside the predetermined period range.

Figure 7:
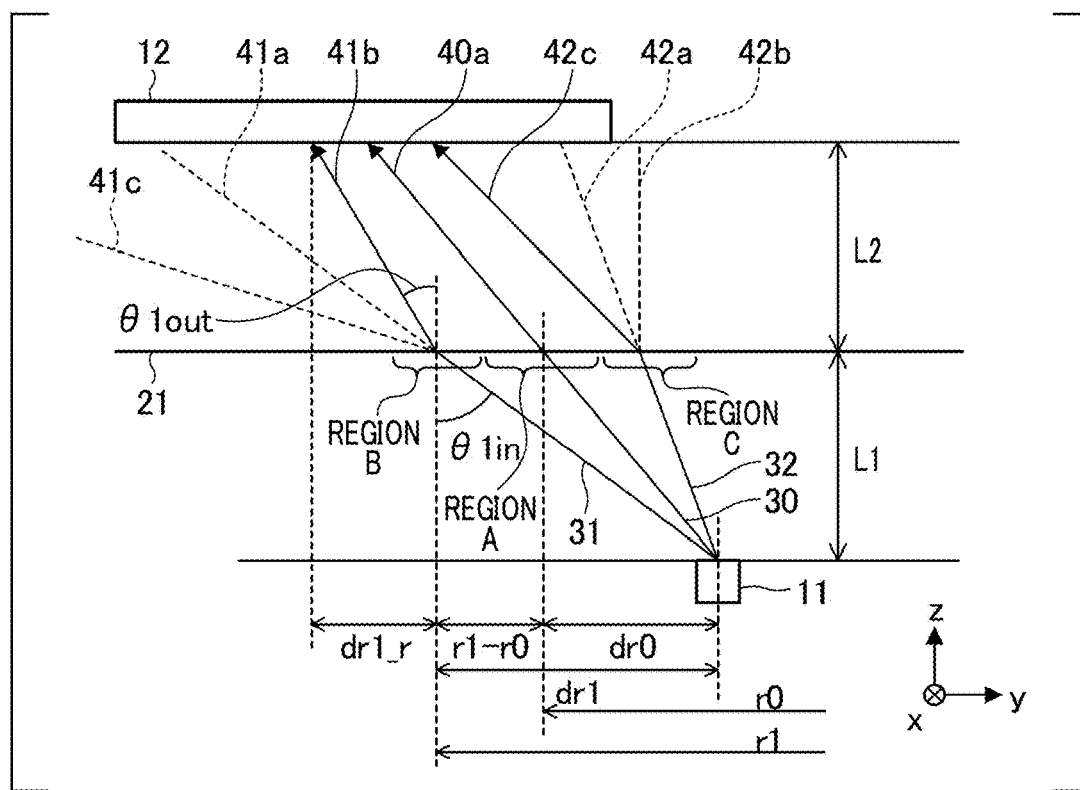
FIG. 7 is a developed view of the optical path of the encoder according to the first embodiment from an X axis side.

FIG. 7 shows a developed view of the optical path from the X axis side. Similar to FIG. 5, the optical path of the encoder of the present embodiment is shown in a developed state, that is, in which reflection is developed like transmission. Next, an action of diffraction will be shown for each radius of the scale with reference to FIG. 7.

A circumferential pattern period Tp×r0 of a light beam passing through the radius r0 of the region A is projected onto the light receiving element array 12 by an optical magnification of M0=(L1+L2)/L1 to form an interference fringe having a spatial period of Tp×r0×M0. A distance dr1 of the radius r1 in the region B from the radial position at which the light emitting point of the light emitting element 11 is disposed can be written as follows.

$$dr1 = r1 - r0 + dr0$$

An optical path length Opl1A of a light beam 31 incident on the radius r1 in the region B from the light emitting point can be written as the following Equation 1.

$$Opl1A = \sqrt{dr1^2 + L1^2} \quad \text{[Equation 1]}$$

An incident angle θ1in of the light beam 31 can be written as the following Equation 2.

$$\theta 1in = \operatorname{atan}\frac{dr1}{L1} \quad \text{[Equation 2]}$$

A distance dr1_r from a radial position, on which the light beam 41b that is diffracted from the radius r1 in an inner circumferential direction and incident on the light receiving element array 12 is incident on the light receiving element array 12, to r1 can be written as the following Equations 3 and 4 using an emission angle θ1out of the diffracted light.

$$dr1\_r = L2 \times \tan\theta 1out \quad \text{[Equation 3]}$$

$$\theta 1out = \sin^{-1}\left(\sin\theta 1\sin - \frac{\lambda}{Rp1}\right) \quad \text{[Equation 4]}$$

An optical path length OplB of the light beam 41b can be written as the following Equation 5.

$$OplB = \sqrt{dr1\_r^2 + L2^2} \quad \text{[Equation 5]}$$

An optical magnification M1 of the light beam diffracted from the radius r1 in the inner circumferential direction and incident on the light receiving element array 12 can be written as the following Equation 6.

$$M1 = \frac{(Op11A + Op11B)}{Op11A} \quad \text{[Equation 6]}$$

The spatial period P1 of the interference fringes in the circumferential direction formed on the light receiving element array 12 by the light beam 41b can be written as the following Equation 7.

$$P1 = Tp \times r1 \times M1 \quad \text{[Equation 7]}$$

The normalized spatial frequency of 1/P1×Ppd is 0.999.

Figure 8:
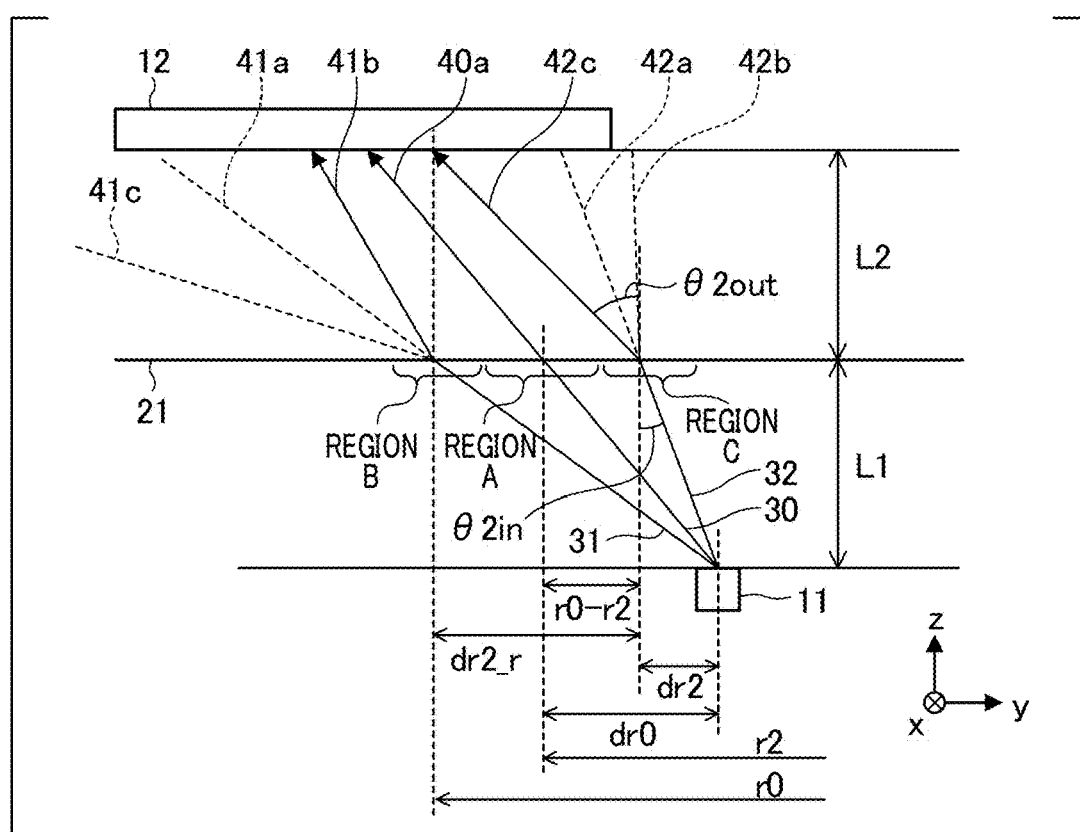
FIG. 8 is a developed view of the optical path of the encoder according to the first embodiment from the X axis side.

Similarly, an action of a light ray passing through r2 on an inner circumferential side will be described with reference to FIG. 8.

A distance dr2 of the radius r2 in the region C from the radial position at which the light emitting point of the light emitting element 11 is disposed can be written as the following Equation 8.

$$dr2 = r2 - r0 + dr0 \qquad \text{[Equation 8]}$$

An optical path length Opl2A of a light beam 32 incident on the radius r2 in the region C from the light emitting point can be written as the following Equation 9.

$$Opl2A = \sqrt{dr2^2 + L1^2} \qquad \text{[Equation 9]}$$

An incident angle θ2in of the light beam 32 can be written as the following Equation 10.

$$\theta 2\text{in} = \operatorname{atan}\frac{dr2}{L1} \qquad \text{[Equation 10]}$$

A distance dr2_r from a radial position, on which a light beam 42c that is diffracted from the radius r2 in an outer circumferential direction and incident on the light receiving element array 12 is incident on the light receiving element array 12, to r2 can be written as the following Equations 11 and 12 using an emission angle θ2out of the diffracted light.

$$dr2\_r = L2 \times \tan\theta 2\text{out} \qquad \text{[Equation 11]}$$

$$\theta 2\text{out} = \sin^{-1}\left(\sin\theta 2\text{in} - \frac{\lambda}{Rp2}\right) \qquad \text{[Equation 12]}$$

An optical path length Opl2B of the light beam 42c can be written as the following Equation 13.

$$Opl2B = \sqrt{dr2\_r^2 + L2^2} \qquad \text{[Equation 5]}$$

An optical magnification M2 of the light beam diffracted from the radius r2 in the outer circumferential direction and incident on the light receiving element array 12 can be written as the following Equation 14.

$$M2 = \frac{(Op12A + Op12B)}{Op12A} \qquad \text{[Equation 14]}$$

The spatial period P2 of the interference fringes in the circumferential direction formed on the light receiving element array 12 by the light beam 42c can be written as the following Equation 15.

$$P2 = Tp \times r2 \times M2 \qquad \text{[Equation 15]}$$

The normalized spatial frequency of 1/P2×Ppd is 1.005. As described above, the optical path length of the diffracted light from the grating (period) pattern in the second radial region to the light receiving element is set to be longer than the optical path length from the light source to the grating (period) pattern in the second radial region.

Also, the optical path length of the diffracted light from the grating (period) pattern in the third radial region to the light receiving element is set to be shorter than the optical path length from the light source to the grating (period) pattern in the third radial region.

On the other hand, a light beam 41a incident on the light receiving element array 12 without being diffracted from the radius r1 in the radial direction is as follows.

A circumferential pattern period Tp×r1 of the light beam 41a (0th-order light in the radial direction) is projected on the light receiving element array 12 by the optical magnification of M0=(L1+L2)/L1 to form an interference fringe having a spatial period P1' of Tp×r1×M0. The spatial period P1' is represented by the following Equation 16.

$$P1' = Tp \times r1 \times M0 \qquad \text{[Equation 16]}$$

The normalized spatial frequency of 1/P1'×Ppd is 0.968. This is equal to r0/r1. On the other hand, the normalized spatial frequency at which the signal disappears is (N−1)/N=0.975, and since the above is further deviated from this, it cannot substantially contribute to detection signals. In other words, the correlation of r1>r0×N/(N−1) is one condition that cannot substantially contribute to the detection signals if there is no radially diffractive structure.

Also, N is the number of interference fringes read by the light receiving element.

Similarly, a light beam 42a incident on the light receiving element array 12 without being diffracted from the radius r2 in the radial direction is as follows. A circumferential pattern period Tp×r2 of the light beam 42a (0th-order light in the radial direction) is projected on the light receiving element array 12 by the optical magnification of M0=(L1+L2)/L1 to form an interference fringe having a spatial period P2' of Tp×r2×M0. The spatial period P2' is represented by the following Equation 17.

$$P2' = Tp \times r2 \times M0 \qquad \text{[Equation 17]}$$

The normalized spatial frequency of 1/P2'×Ppd is 1.034. This is equal to r0/r2. On the other hand, the normalized spatial frequency at which the signal disappears is (N−1)/N=1.025, and since the above is further deviated from this, it cannot substantially contribute to the detection signals.

In other words, the correlation of r2<r0×N/(N+1) is one condition that cannot substantially contribute to the detection signals if there is no radially diffractive structure.

As described above, if there is no radially diffractive structure, light beams that pass through the radii r1 and r2 while satisfying the above conditions cannot effectively contribute to the detection signals.

Figure 9:
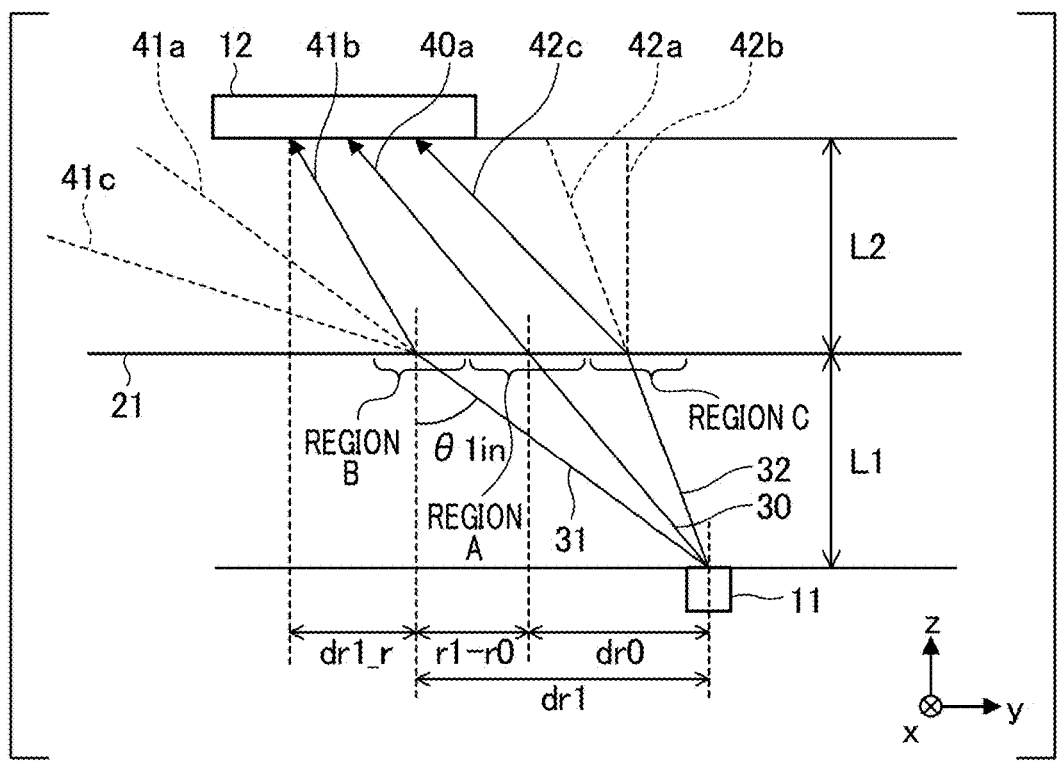
FIG. 9 is a developed view of the optical path of the encoder according to the first embodiment from the X axis side.

It is desirable that the radial size Ypd of the light receiving element array 12 cover positions on which the light beams that substantially contribute to the detection signals, that is, the light beam 41b diffracted from the radius r1 in the inner circumferential direction, and the light beam 42c diffracted from the radius r2 in the outer circumferential direction, are incident. More preferably, as shown in FIG. 9, A signal-to-noise ratio (S/N ratio) of the signals can be improved by setting it to have a width (for example, Ypd=600 μm) with which the light beams that do not substantially contribute to the detection signals such as the light beams 41a and 42a that are not diffracted in the radial direction from the radius r1 and the radius r2 are not incident thereon.

As described above, if there is no radially diffractive structure as in the present embodiment, the pattern of the radial position r1 or r2 generates only the radially 0th-order light component, which deviates from the predetermined period range that can be detected by the light receiving element. Thus, the pattern of the radial position r1 or r2 cannot contribute to the S/N ratio of the position detection signals. However, in the present embodiment, in order to cause the pattern outside the predetermined period range to also efficiently contribute to the detection signals, the pattern of the radial position (radial region) of r1 or r2 has the radially diffractive structure.

Further, the light from the light source is radiated to the grating pattern from a side closer to the center of the rotary scale than the grating pattern. In addition, the light receiving element is disposed to receive the diffracted light from the grating pattern on a side farther from the center of the rotary scale than the grating pattern.

Also, the first pattern may be arranged such that any one of optical characteristics such as a transmittance, a reflectance, and an optical path difference alternately changes at every predetermined angle in the circumferential direction. Similarly, the concentric circular patterns may be arranged such that any one of the optical characteristics such as the transmittance, the reflectance, and the optical path difference changes in the radial direction.

More preferably, the interference fringes in the circumferential direction which are formed by the light being diffracted in the radial direction are within a range of half or less of a deviation of the spatial frequency at which the signal disappears. When the number of the interference fringes used for detection is N and the period at which the detection sensitivity reaches a peak is P0, the spatial frequency at which the signal disappears can be written as follows.

$$(N\pm 1)/N/P0$$

If the light receiving element array is used as the detection grating as in the present embodiment, P0=Ppd.

Preferably, the spatial period P of the interference fringes in the circumferential direction (P1 or P2 in the present embodiment) formed on the detection grating by the light beam that is diffracted in the radial direction and incident on the light receiving element array 12 satisfies the following condition. For this reason, a distance Rp (Rp1 or Rp2 in the present embodiment), which is a grating structure period in the radial direction, is set to meet the following condition.

$$(N-0.5)/N/P0<1/P<(N+0.5)/N/P0$$

The light receiving element array is disposed to receive the first interference fringe having a period Q1 formed by the first pattern, and to receive the second interference fringe having a period Q2 that is diffracted by the second pattern and formed in a direction of the first interference fringe. In addition, the optical encoder is configured to satisfy the following condition for the second pattern of the region C.

$$P2\times Q1/P1<Q2<P1\times Q1/P2$$

In addition, the optical encoder is configured to satisfy the following condition for the second pattern of the region B.

$$P2\times Q1/P1>Q2>P1\times Q1/P2$$

Furthermore, the optical encoder is preferably configured to satisfy the following condition for the second pattern of the region C.

$$P2\times Q1/P1<Q2<Q1$$

The second pattern of the region B is preferably configured to satisfy the following condition.

$$P2\times Q1/P1>Q2>Q1$$

As described above, according to the present embodiment, the diffractive structure having a predetermined period in the radial direction is provided in the region having the radius r1 or r2 that is a region in which the period in the circumferential direction is deviated so that it cannot substantially contribute to the detection signals. Also, the light beam is diffracted from the region having the radius r1 or r2 and forms the interference fringes having the period detectable on the detection grating.

As a result, the light beam from the radial regions that cannot substantially contribute to the detection signals in the conventional technique can be received as an effective light beam, so that light utilization efficiency can be improved and the SN ratio can be improved.

Second Embodiment

Figure 10:
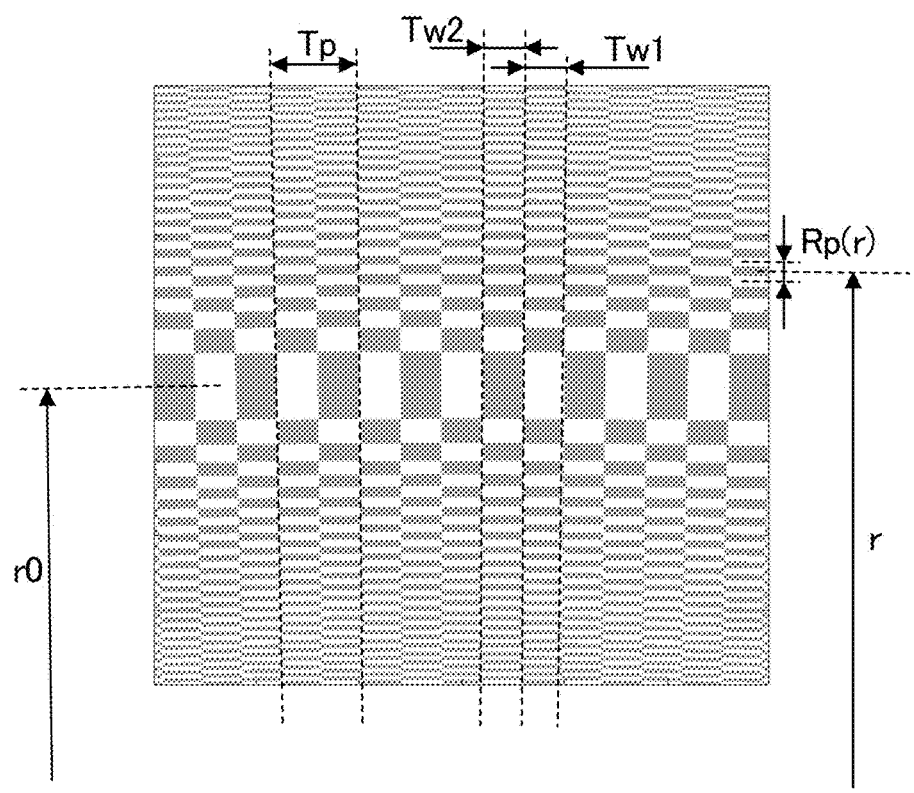
FIG. 10 is a diagram showing an example of a grating pattern according to a second embodiment.

FIG. 10 is a diagram showing an example of a grating pattern 21 according to a second embodiment. Other constituents are common to those of the first embodiment. The scale 20 in the present embodiment is provided with the grating pattern 21, which is formed as a reflective diffraction grating including a reflection film on the entire surface, at phase steps alternately arranged in the circumferential direction. In FIG. 10, gray portions are concave portions and white portions are convex portions. A phase difference due to the concave portion and the convex portion is designed to be about wavelength/2.

A plurality of slit columns formed by the concave portions and the convex portions that are alternately arranged in the circumferential direction are provided in the grating pattern 21 to be arranged in the radial direction. In the slit columns, columns of the convex portions respectively having widths Tw1 and Tw2 in the circumferential direction are disposed alternately adjacent to each other with their grating phases in the circumferential direction differentiated by 180 degrees in the radial direction.

A distance Rp(r) between radial centers of the adjacent slit columns having the same grating phase in the circumferential direction changes to be gradually smaller as the radius r moves away from r0.

The following parameters are used in the present embodiment.

Tp=2a/864=0.007272 rad

Tw1=Tp/2

Tw2=Tp/2 r0=5.5 mm

λ=650 nm dr0=1 mm

L1=L2=2 mm

Also, although a reflective scale is used in the present embodiment, the present embodiment is not limited thereto and it may be formed into a transmissive type. In that case, the reflective film may be eliminated, a stepped structure made of a transparent base material may be used, and a phase difference due to the difference in refractive index between air and the transparent base material may be set to be λ/2.

Next, an action of radial diffraction will be described with reference to FIG. 11.

Figure 13:
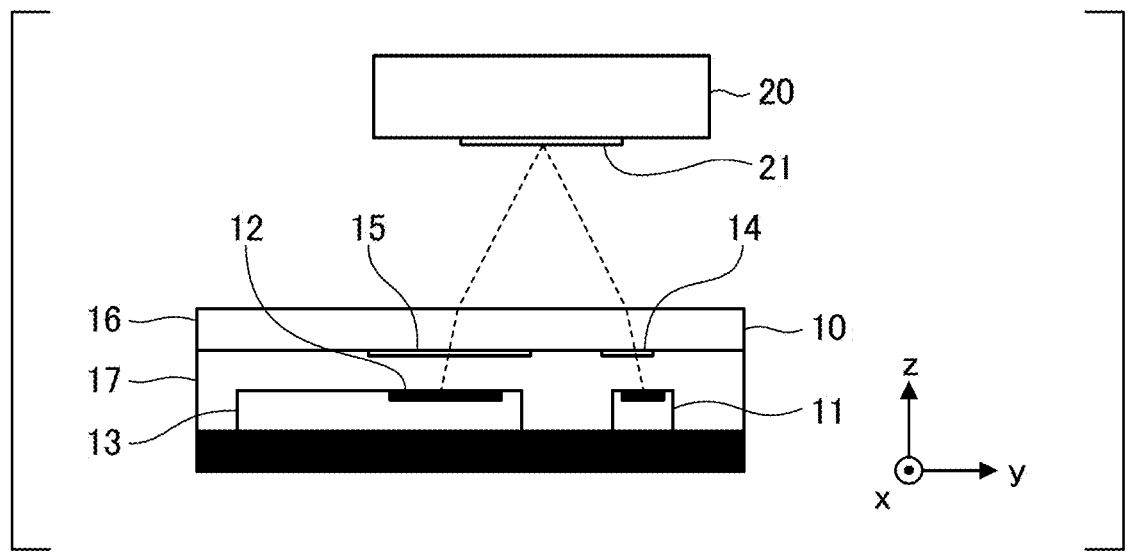
FIG. 13 is a diagram showing a cross-sectional structure of an optical encoder according to a third embodiment.

The +1st-order diffracted light and the −1st-order diffracted light that are diffracted and reflected by the grating pattern 21 interfere with each other on an index grating 15 shown in FIG. 13, for example, and interference fringes with a period P(r) are formed.

That is, it acts as a diffractive lens having a condensing effect in the radial direction, and forms a substantially focal point on the light receiving element array 12. In order to form the focal point, for example, the distance Rp(r) between the centers of the slit columns may be determined to satisfy the following Equations 18 to 22.

$$Rp(r) = \text{ABS}(\lambda / (\sin\theta\text{in} - \sin\theta\text{out}))  \quad \text{[Equation 18]}$$

$$\theta\text{in} = \text{atan}\frac{dr1}{L1} \quad \text{[Equation 19]}$$

$$\theta\text{out} = \text{atan}\frac{dr\_r}{L2} \quad \text{[Equation 20]}$$

$$dr = r - r0 + dr0 \quad \text{[Equation 21]}$$

$$dr\_r = 2 \cdot dr0 - dr \quad \text{[Equation 22]}$$

The optical path length Opl1A of the light beam 31 incident on the radius r from the light emitting point can be written as the following Equation 23.

$$Opl A = \sqrt{dr^2 + L1^2} \quad \text{[Equation 23]}$$

The optical path length OplB of the light beam 41b can be written as in the following Equation 24.

$$Opl B = \sqrt{dr\_r^2 + L2^2} \quad \text{[Equation 24]}$$

The optical magnification M1 of the light beam that is diffracted from the radius r to the inner circumferential direction and incident on the light receiving element array 12 can be written as the following Equation 25.

$$M1 = \frac{(Op11A + Op11B)}{Op11A} \quad \text{[Equation 25]}$$

The spatial period P1 of the interference fringes in the circumferential direction formed on the light receiving element array 12 by the light beam 41b can be written as the following Equation 26.

$$P1 = Tp \times r \times M1/2 \quad \text{[Equation 26]}$$

Figure 12:
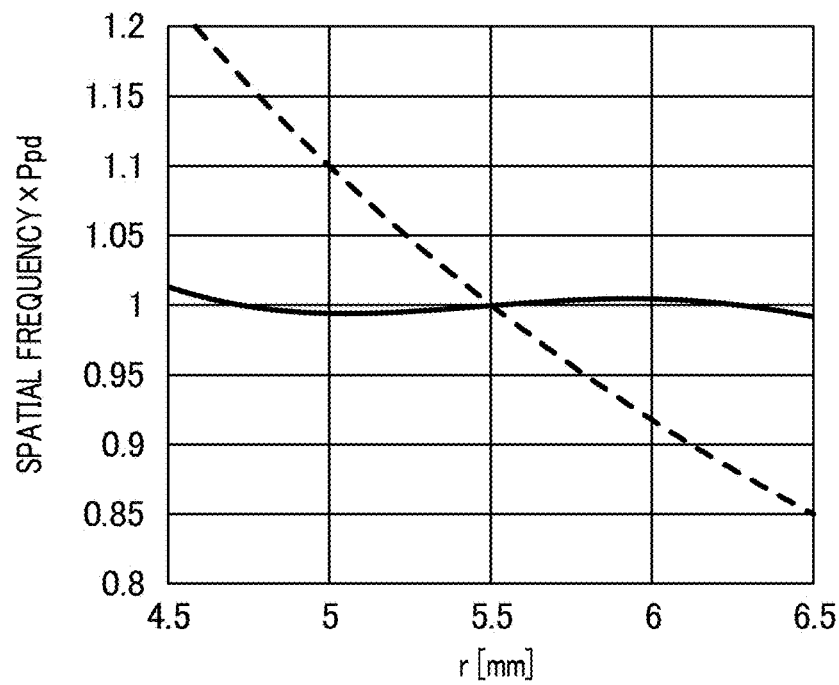
FIG. 12 is a diagram showing a relationship between a normalized spatial frequency of $1/P(r) \times Ppd$ on a light receiving element array 12 and a radial position r through which a light beam has passed in the second embodiment.

Under the above conditions, the solid line in FIG. 12 shows a relationship between the normalized spatial frequency of 1/P(r)×Ppd on the light receiving element array 12 and the radial position r through which the light beam passes.

On the other hand, the pattern period Tp×r of the light beam 41a (0th-order light in the radial direction) in the circumferential direction which is incident on the light receiving element array 12 without being diffracted in the radial direction from the radius r is projected on the light receiving element array 12 by the optical magnification of M0=(L1+L2)/L1. As a result, an interference fringe having a spatial period P(r)' represented by the following Equation 27 is formed.

$$P(r)' = Tp \times r \times M0/2 \quad \text{[Equation 27]}$$

A relationship between the normalized spatial frequency of 1/P(r)'×Ppd and the radial position r, through which the light beam passes, of the component that is not diffracted in the radial direction and is incident on the light receiving element array 12 is shown by the broken line in FIG. 12.

As shown in FIG. 12, when the period P of the interference fringes deviates from Ppd, the output signal amplitude attenuates. When the number of interference fringes to be read is N (40 in the present embodiment), the value of Ppd/P deviates up to (N+1)/N=1.025, or (N−1)/N=0.975, the signal disappears.

That is, if there is no radially diffractive structure, the light beam passing through a position deviating from the reading center radius r0 by ±0.1 mm or more cannot effectively contribute to the detection signals. On the other hand, as shown by the solid line, by providing the radially diffractive structure, even the light beam passing through the position deviating from the reading center radius r0 by ±1 mm can effectively contribute to the detection signals.

As described above, it can be seen that, by providing the radially diffractive structure, it is possible to substantially contribute to the detection signals over a wide radial region. Further, conditions for widening a radial range that substantially contributes to the detection signals while providing a light condensing effect in the radial direction will be described.

Figure 11:
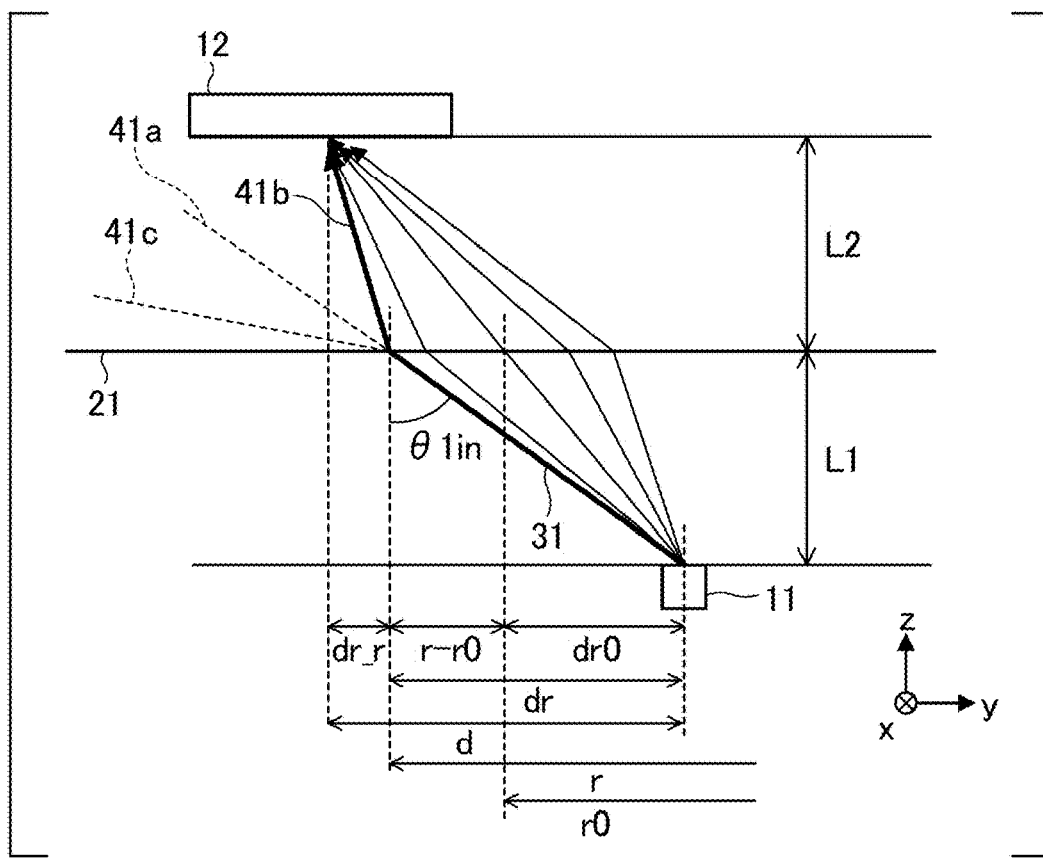
FIG. 11 is a developed view of an optical path of an encoder according to the second embodiment from the X axis side.

In FIG. 11, when the distance from the light emitting element 11 to the grating pattern 21 is L1, and the distance L2 from the grating pattern 21 to the light receiving element array 12 is set equal to (or within a range that can be regarded as equal to) L1, the relation of L1=L2=L is satisfied. The light receiving portion is arranged on the outer peripheral side of the rotation axis with respect to the light emitting element. A radial distance from the radial center of the light receiving portion to the radial center of the light emitting element is d, and the scale radius at a midpoint between the two in the radial direction is r0.

If the following Equation 28 is satisfied, a light collection effect and a wide detection range can be obtained.

$$0.25 < \frac{\frac{d}{2} \cdot r0}{L^2 + \left(\frac{d}{2}\right)^2} < 4 \quad \text{[Equation 28]}$$

In particular, when the following Equation 29 approaches 1, an ideal light condensing state is achieved.

$$\frac{\frac{d}{2} \cdot r0}{L^2 + \left(\frac{d}{2}\right)^2} \quad \text{[Equation 29]}$$

As described above, by arranging the light source, the arrangement of the light receiving element in the radial direction, and the distance to the scale to satisfy the conditions, it is possible to effectively contribute to the detection signals while condensing the light in a narrow range in the radial direction. By condensing the light in the radial direction, the effect of increasing an allowable amount of in-plane rotation can also be obtained.

Third Embodiment

FIG. 13 shows another configuration example of the optical encoder according to the present embodiment.

The sensor unit 10 is a light receiving and emitting integrated type sensor unit on which the light emitting element 11 configured of an LED and the light receiving IC 13 having the light receiving element array 12 are mounted in the same package. A light source grating (a light source pattern) 14 serving as a first grating, which is formed as a transmissive diffraction grating by transmissive portions and light shielding portions that are alternately arranged in the position detecting direction, is provided in an optical path from the light emitting element 11 to the scale 20 (see FIG. 16).

The index grating (an intermediate pattern) 15 serving as a third grating is provided in an optical path from the scale 20 to the light receiving element array 12 (between the scale 20 and the light receiving element array 12). The index grating 15 is formed as a transmissive diffraction grating by the transmissive portions and the shielding portions that are alternately arranged in the position detecting direction.

The light source grating 14 and the index grating 15 are provided by forming a chrome film serving as a transmissive portion on one surface of a cover glass 16. The cover glass 16 provided with the light source grating 14 and the index grating 15 is attached to a translucent resin 17 in which the light emitting element 11 and the light receiving IC 13 are encapsulated, and is optically integrated with the light emitting element 11 and the light receiving IC 13.

Figure 14:
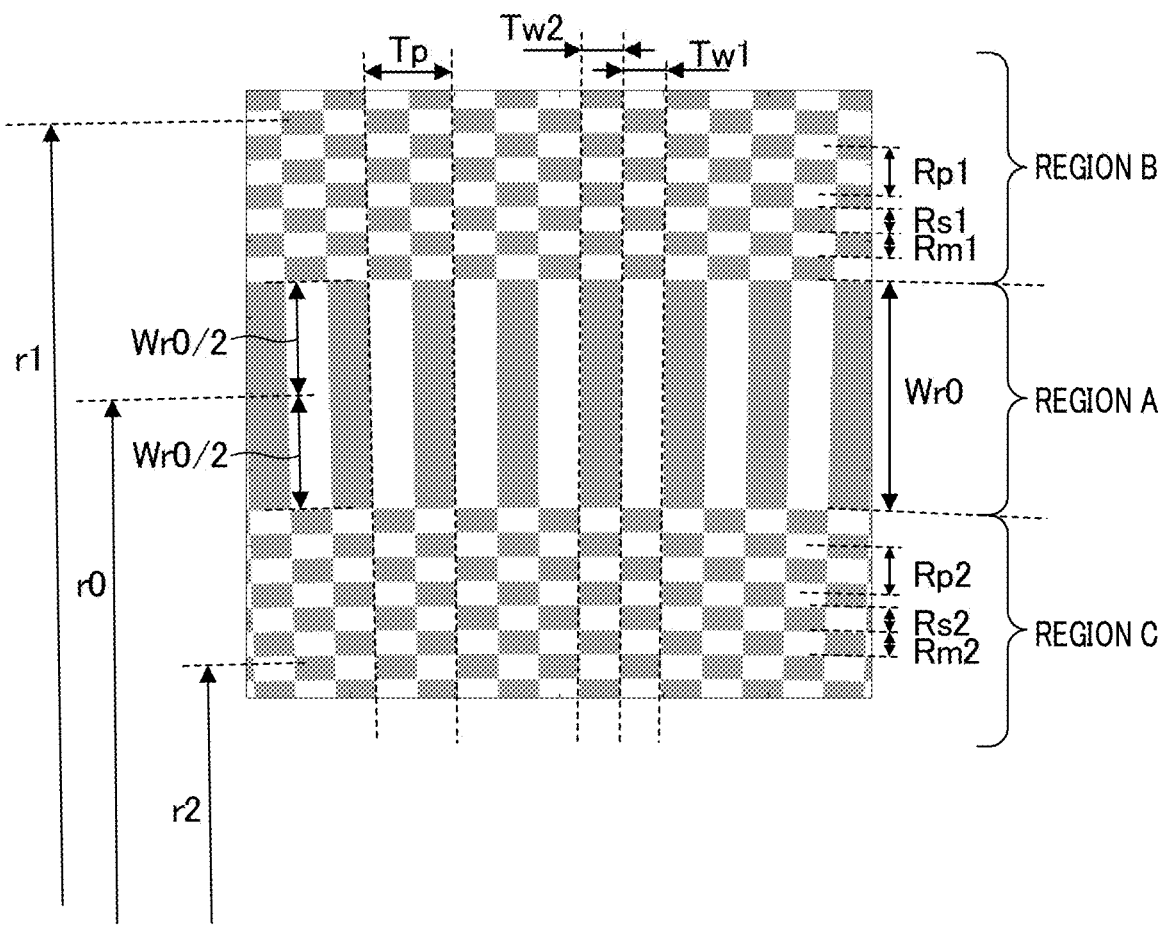
FIG. 14 is a diagram showing an example of a grating pattern according to the third embodiment.

FIG. 14 is a diagram showing an example of the grating pattern 21 on the scale 20 according to a third embodiment. The scale 20 in the present embodiment is provided with a grating pattern 21 formed as a reflective diffraction grating including a reflection film on the entire surface at phase steps alternately arranged in the circumferential direction. In FIG. 14, gray portions are concave portions and white portions are convex portions. A phase difference due to the concave portion and the convex portion is designed to be about wavelength/2.

A region having a width $Wr0$ in the radial direction centered on the reading center radius $r0$ includes a region A, in which slit columns formed by the convex portions and the concave portions arranged alternately in the circumferential direction are provided.

A region having a radius larger than $r0+Wr0/2$ includes a region B including a predetermined radius $r1$. In the region B, a plurality of slit columns formed by the convex portions and the concave portions alternately arranged in the circumferential direction are arranged in the radial direction.

In the slit columns, columns of the convex portions respectively having widths $Tw1$ and $Tw2$ in the circumferential direction are disposed alternately adjacent to each other with their circumferential grating phases differentiated by 180 degrees in the radial direction. In the circumferential grating phases arranged alternately in the radial direction, a distance between the radial centers of the grating phases adjacent to each other in the radial direction is $Rp1$, and a width of the convex portion and a width of the concave portion in the radial direction are $Rs1$ and $Rm1$, respectively.

Similarly, a region having a radius smaller than $r0-Wr0/2$ includes a region C including a predetermined radius $r2$, and a plurality of slit columns formed by the convex portions and the concave portions alternately arranged in the circumferential direction are arranged in the radial direction. In the slit columns, columns of the convex portions respectively having widths $Tw1$ and $Tw2$ in the circumferential direction are disposed alternately adjacent to each other with their circumferential grating phases differentiated by 180 degrees in the radial direction. In the circumferential grating phases arranged alternately in the radial direction, a distance between the radial centers of the grating phases adjacent to each other in the radial direction is $Rp2$, and a width of the convex portion and a width of the concave portion in the radial direction is $Rs2$ and $Rm2$, respectively.

The following parameters are used in the present embodiment.

$WR0=0.12$ mm
$Tp=2\pi/1885=0.0033333$ rad
$Tw1=Tp/2$
$Tw2=Tp/2$
$Rp1=9$ μm
$Rs1=Rp1/2$
$Rm1=Rp1/2$
$Rp2=9$ μm
$Rs2=Rp2/2$
$Rm2=Rp2/2$
$r0=6$ mm
$r1=6.1$ mm
$r2=5.9$ mm Although a reflective scale is used in the present embodiment, the present invention is not limited thereto and it may be formed into a transmissive type. In that case, the reflective film may be eliminated, a stepped structure made of a transparent base material may be used, and the phase difference due to the difference in refractive index between air and the transparent base material may be set to be wavelength/2.

In the present embodiment, the light receiving element array 12 is configured by arranging 32 light receiving elements in a row in the position detecting direction.

The distance (adjacent element pitch) $Xpd$ between centers of two light receiving elements adjacent to each other in the position detecting direction is 64 μm. Also, the size (width) $Ypd$ of each light receiving element in the direction (Y direction) orthogonal to the position detecting direction is 450 μm.

The 32 light receiving elements are cyclically allocated to the A(+) phase, the B(+) phase, the A(−) phase, and the B(−) phase in this order, and 8 (2 or more) light receiving elements allocated to each of these four phases form one light receiving element group. That is, in the present embodiment, four light receiving element groups each including eight light receiving elements are provided.

The eight light receiving elements constituting each light receiving element group are electrically connected to each other, and outputs (currents) thereof are added to each other and input to an IV conversion amplifier (not shown) provided for each phase in the latter part. The distance (in-group element pitch P) $Ppd$ between the centers of the two light receiving elements that are closest to each other in the position detecting direction among the eight light receiving elements constituting the same light receiving element group disposed at every four position is 256 (=64×4) μm.

Figure 15:
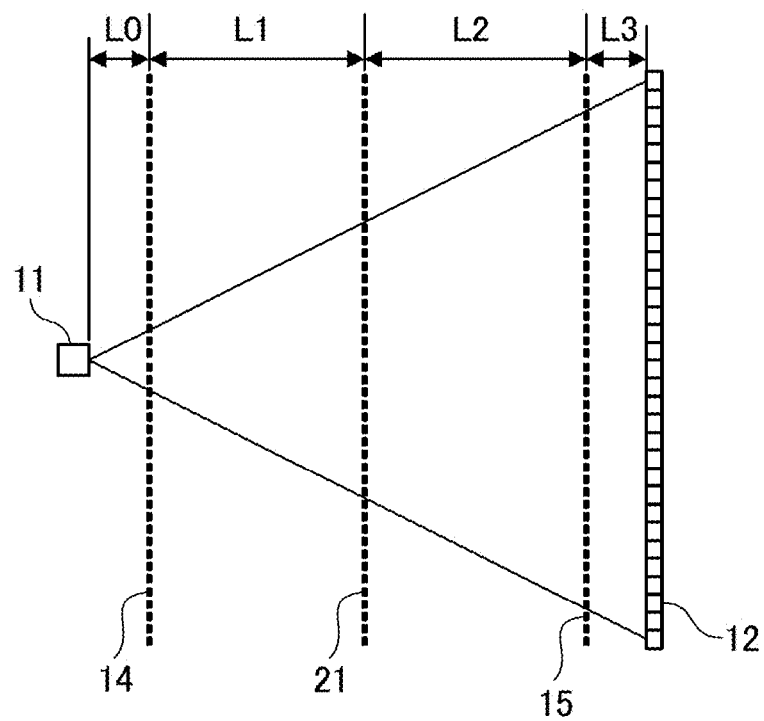
FIG. 15 is a developed view of an optical path of an encoder of the third embodiment.

In FIG. 15, the optical path of the encoder of the present embodiment is shown in a developed state, that is, in which reflection is developed like transmission. A distance $L0$ between the light emitting element 11 and the light source grating 14 is 0.3 mm. A distance $L1$ from the light source grating 14 (a secondary point light source, which will be described later) constituting a light source together with the light emitting element 11 to the grating pattern 21 is set to a range of 2.1 mm±0.3 mm.

A distance $L2$ from the grating pattern 21 to the index grating 15 is set equal to (or within a range that can be regarded as equal to) $L1$. In the present embodiment, $L1=L2=2.1$ mm. A distance $L3$ as an effective optical path length from the index grating 15 to the light receiving element array 12 is 0.3 mm. The effective optical path length is a value obtained by dividing a physical length by a refractive index.

Figure 16:
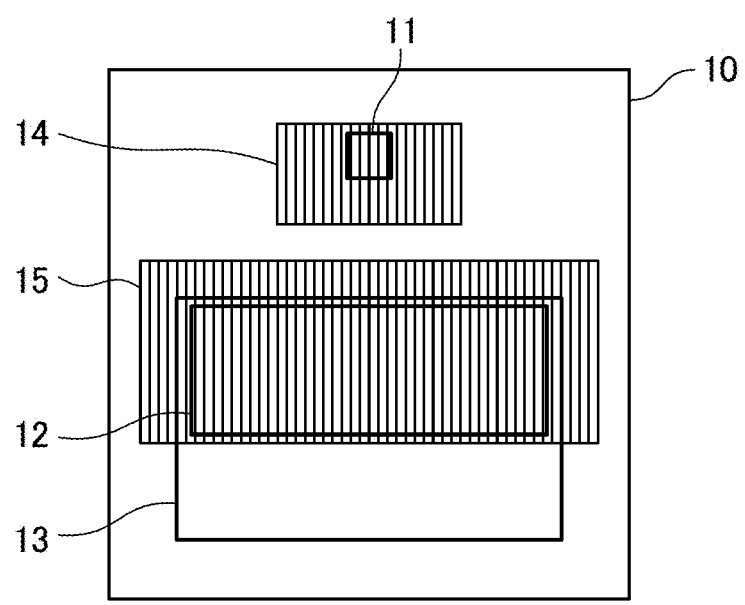
FIG. 16 is a diagram of the encoder according to the third embodiment viewed from a scale side.

FIG. 16 shows a configuration of the sensor unit 10 viewed from the scale side. A grating pitch $P1$ of the light source grating 14 is 20 μm, and a grating pitch $P3$ of the index grating 15 is 18.46154 μm.

A divergent light beam emitted from the LED as the light emitting element 11 passes through the light source grating 14 to form a light source array including a plurality of secondary point light sources incoherent to each other.

The divergent light beam emitted from the light source grating 14 enters the grating pattern 21. Also, although the secondary point light source is formed by the combination of the LED and the light source grating 14 in the present embodiment, instead of this, a current constriction type LED, a semiconductor laser or the like may be disposed as an effective point light source. Further, although the divergent light beam from the point light source on the light source grating 14 is directly incident on the grating pattern 21 in the present embodiment, instead of this, a lens may be used to convert a position of the effective point light source so that the light is incident on the grating pattern 21.

In this case, L is replaced with a distance between the effective point light source and the grating pattern 21.

The +1st-order diffracted light and the −1st-order diffracted light that are diffracted and reflected by the grating pattern 21 interfere with each other on the index grating 15 to form an interference fringe having a period P. Due to a difference between the grating pitches P3 of the index grating 15 and P, a light intensity distribution (interference fringes) in which a rough spatial period Pm is superimposed on original interference fringes passes through the index grating 15.

The spatial period Pm can be expressed by the following equation. However, ABS(x) is a function representing an absolute value of x.

$$Pm = ABS(P \cdot P3/(P-P3))$$

The light intensity distribution of the spatial period Pm transmitted through the index grating 15 further propagates and is projected on the light receiving element array 12 by an image magnification M. That is, the light intensity distribution of a spatial period M·Pm is formed on the light receiving element array 12. The image magnification M at this time is expressed as below.

$$M = (L0+L1+L2+L3)/(L0+L1+L2)$$

The intensity distribution having the period of M·Pm is formed on the light receiving element array 12, and the detected amplitude has a peak in the following case.

$$M \cdot Pm = Ppd$$

In other words, the spatial period P0 at which the detected amplitude peaks on the index grating 15 can be expressed as follows.

$$P0 = P3 \cdot Ppd/(Ppd - M \cdot P3) = 20 \, \mu m$$

At that time, the number N of the interference fringes read on the index grating 15 is N=96 by dividing the total width 2048 μm of the light receiving element array 12 by P0·M.

Figure 17:
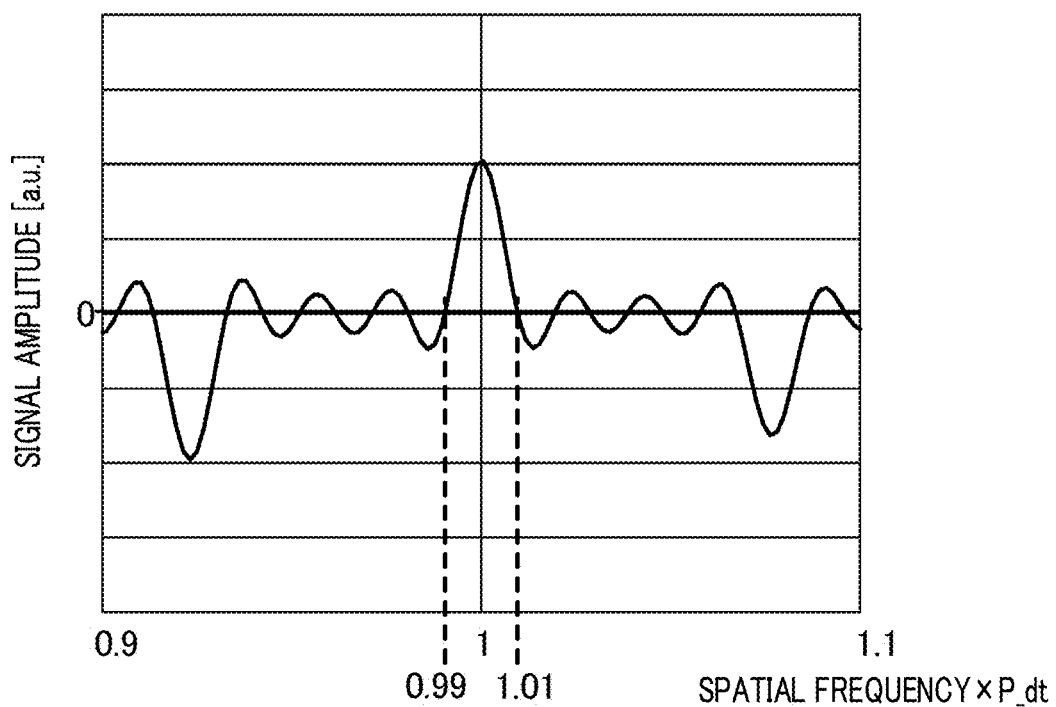
FIG. 17 is a diagram showing a spatial frequency response characteristic of a detection unit according to the third embodiment.

FIG. 17 shows response characteristics of an output signal amplitude of each of the four IV amplifiers, which are provided for the four phases, with respect to the spatial frequency P of the interference fringes on the index grating 15. The spatial frequency on a horizontal axis is normalized by a reciprocal of P0 of a detected peak frequency of a detection system formed by the index grating and the light receiving element array, and a response of the signal amplitude has a peak at 1.

If the period P of the interference fringes deviates from P0, the output signal amplitude attenuates, and in the case in which the number of the interference fringes to be read is N (96 in the present embodiment), when P0/P deviates up to (N+1)/N=1.01 or (N−1)/N=0.99, the signal disappears.

Figure 18:
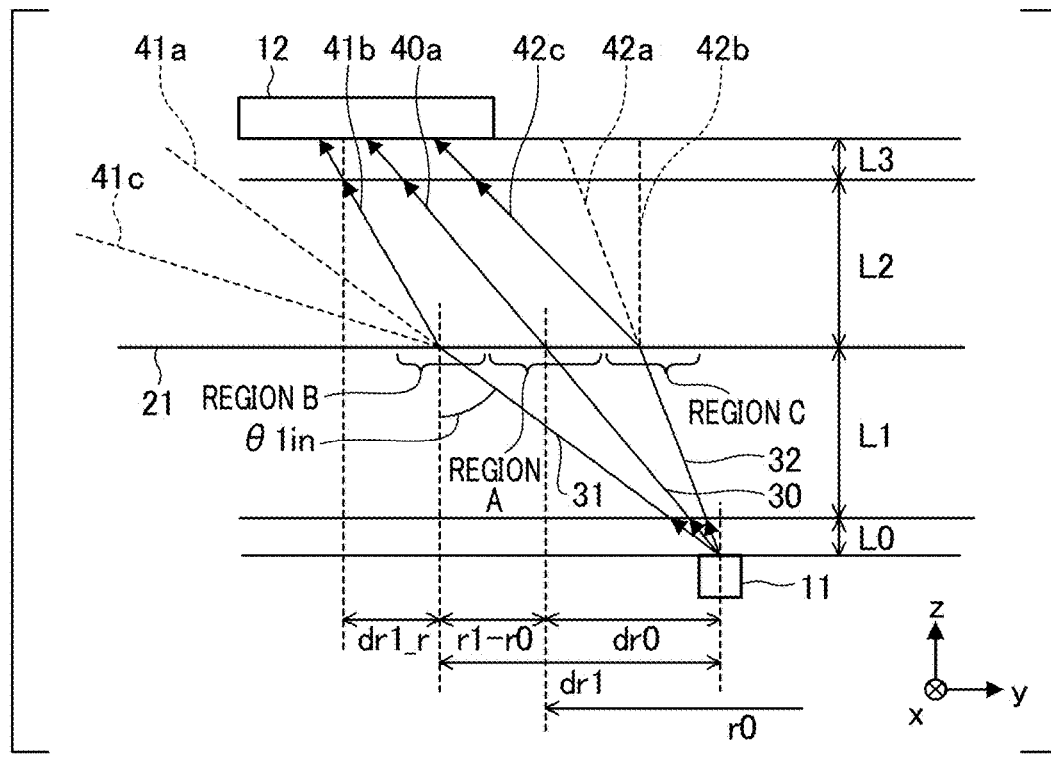
FIG. 18 is a developed view of the optical path of the encoder according to the third embodiment from the X axis side.

Next, an action of diffraction will be shown for each scale radius with reference to FIG. 18.

A center wavelength of the light source is $\lambda$, and a distance from a radius at which the light emitting point of the light emitting element 11 is disposed to the reading center radius r0 is dr0. In the present embodiment, they are set as follows.

$\lambda = 650$ nm dr0 = 1 mm

The circumferential pattern period Tp×r of the light beam passing through the radius r0 of the region A is projected onto the light receiving element array 12 by an optical magnification of M0=(L1+L2)/L1 to form an interference fringe having a spatial period of Tp×r0×M0/2. The distance dr1 of the radius r1 in the region B from the radius at which the light emitting point of the light emitting element 11 is disposed can be written as the following Equation 30.

$$dr1 = r1 - r0 + dr0 \qquad \text{[Equation 30]}$$

The incident angle θ1in of the light beam 31 can be written as the following Equation 31.

$$\theta 1in = \operatorname{atan}\frac{dr1}{L0+L1} \qquad \text{[Equation 31]}$$

The optical path length Opl1A of the light beam 31 incident on the radius r1 in the region B from the light source grating can be written as the following Equation 32.

$$Opl1A = \sqrt{(dr1 - L0 \cdot \tan\theta 1in)^2 + L1^2} \qquad \text{[Equation 32]}$$

The distance dr1_r from the radial position of the light beam 41b incident on the index grating to r1, which is diffracted from the radius r1 in the inner circumferential direction and incident on the light receiving element array 12, can be written as the following Equations 33 and 34 using the emission angle θ1out of the diffracted light.

$$dr1\_r = L2 \times \tan\theta 1out \qquad \text{[Equation 33]}$$

$$\theta 1out = \sin^{-1}\left(\sin\theta 1in - \frac{\lambda}{Rp1}\right) \qquad \text{[Equation 34]}$$

The optical path length OplB of the light beam 41b can be written as the following Equation 35.

$$OplB = \sqrt{dr1\_r^2 + L2^2} \qquad \text{[Equation 35]}$$

The optical magnification M1 of the light beam diffracted from the radius r1 in the inner circumferential direction and incident on the light receiving element array 12 can be written as the following Equation 36.

$$M1 = \frac{(Opl1A + Opl1B)}{Opl1A} \qquad \text{[Equation 36]}$$

The spatial period P1 of the interference fringes in the circumferential direction formed on the light receiving element array 12 by the light beam 41b can be written as the following Equation 37.

$$P1 = Tp \times r1 \times M1/2 \qquad \text{[Equation 37]}$$

The normalized spatial frequency of 1/P1×P0 is 0.999.

Figure 19:
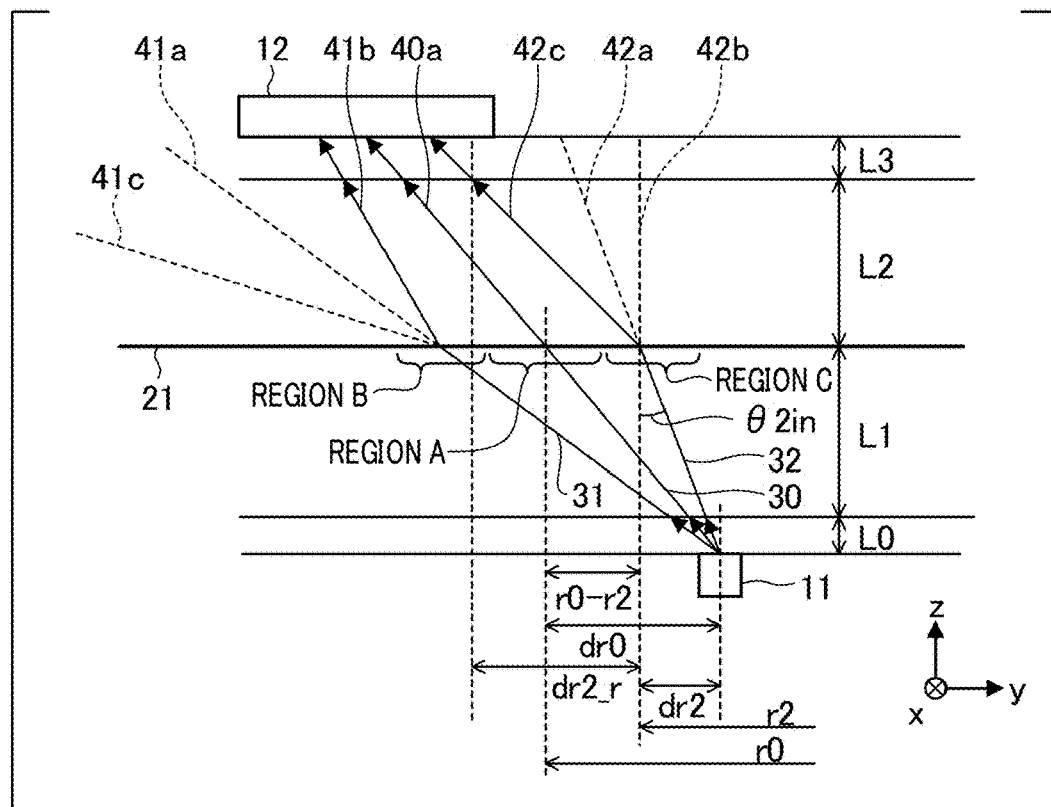
FIG. 19 is a developed view of the optical path of the encoder according to the third embodiment from the X axis side.

Similarly, an action of the light ray passing through r2 on the inner circumferential side will be described with reference to FIG. 19.

The distance dr2 of the radius r2 in the region C from the radius at which the light emitting point of the light emitting element 11 is disposed can be written as the following Equation 38.

$$dr2 = r2 - r0 + dr0 \quad \text{[Equation 38]}$$

The incident angle θ2in of the light beam 31 can be written as the following Equation 39.

$$\theta 2in = \operatorname{atan}\frac{dr2}{L0 + L1} \quad \text{[Equation 39]}$$

The optical path length Opl2A of the light beam 32 incident on the radius r2 in the region C from the light emitting point can be written as the following Equation 40.

$$Opl2A = \sqrt{(dr2 - L0 \cdot \tan\theta 2in)^2 + L1^2} \quad \text{[Equation 40]}$$

The distance dr2_r from the radial position incident on the light receiving element array 12 to r2 of the light beam 42c which is diffracted from the radius r2 in the outer circumferential direction and incident on the light receiving element array 12 can be written as the following Equations 41 and 42 using the emission angle θ2out of the diffracted light.

$$dr2\_r = L2 \times \tan\theta 2out \quad \text{[Equation 41]}$$

$$\theta 2out = \sin^{-1}\left(\sin\theta 2in - \frac{\lambda}{Rp2}\right) \quad \text{[Equation 42]}$$

The optical path length Opl2B of the light beam 42c can be written as the following Equation 43.

$$Opl2B = \sqrt{dr2\_r^2 + L2^2} \quad \text{[Equation 43]}$$

The optical magnification M2 of the light beam diffracted from the radius r2 in the outer circumferential direction and incident on the light receiving element array 12 can be written as the following Equation 44.

$$M2 = \frac{(Op12A + Op12B)}{Op12A} \quad \text{[Equation 44]}$$

The spatial period P2 of the interference fringes in the circumferential direction formed on the light receiving element array 12 by the light beam 42c can be written as in the following Equation 45.

$$P2 = Tp \times r2 \times M2/2 \quad \text{[Equation 45]}$$

The normalized spatial frequency of 1/P2×Ppd is 1.000.

On the other hand, the light beam 41a incident on the light receiving element array 12 without being diffracted from the radius r1 in the radial direction is as in the following Equation 46. The circumferential pattern period Tp×r1 of the light beam 41a (0th-order light in the radial direction) is projected on the light receiving element array 12 by the optical magnification of M0=(L1+L2)/L1 to form an interference fringe having a spatial period P1' of Tp×r1×M0/2.

$$P1' = Tp \times r1 \times M0/2 \quad \text{[Equation 46]}$$

The normalized spatial frequency of 1/P1'×P0 is 0.984.

Similarly, the light beam 42a incident on the light receiving element array 12 without being diffracted from the radius r2 in the radial direction is as in the following Equation 47.

The circumferential pattern period Tp×r2 of the light beam 42a (0th-order light in the radial direction) is projected on the light receiving element array 12 by the optical magnification of M0=(L1+L2)/L1 to form an interference fringe having a spatial period P2' of Tp×r2×M0.

$$P2' = Tp \times r2 \times M0 \quad \text{[Equation 47]}$$

The normalized spatial frequency of 1/P2'×Ppd is 1.017.

It can be seen from FIG. 17 that the output responses resulting from the interference fringes due to the light beams that are not diffracted in the radial direction from the radii r1 and r2 have opposite signs to the response of the period P0 at which the detection sensitivity has a peak, and are components that do not substantially contribute to the detection signals. That is, if there is no radially diffractive structure, the light beam passing through the radii r1 and r2 cannot effectively contribute to the detection signals.

As described above, according to the present embodiment, the radially diffractive structure with an appropriate period is provided to diffract the light beam from the pattern at the radial position in the region in which the period in the circumferential direction is deviated so that it cannot substantially contribute to the detection signals, whereby the interference fringes having a period that can be detected on the detection grating are formed.

Fourth Embodiment

Figure 20:
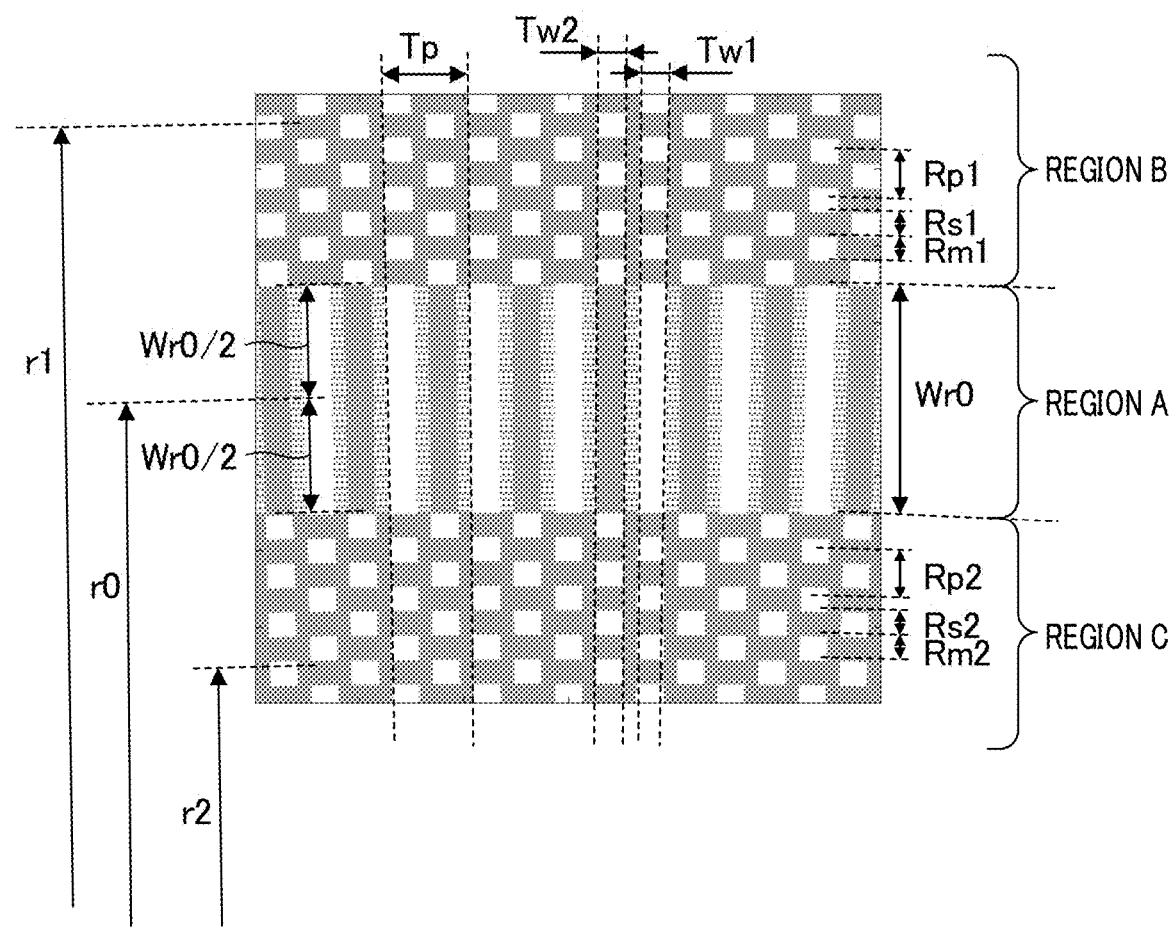
FIG. 20 is a diagram showing an example of a grating pattern according to a fourth embodiment.

FIG. 20 is a diagram showing an example of the grating pattern 21 according to a fourth embodiment. The scale 20 in the present embodiment is provided with a grating pattern (a grating pattern) 21, which is formed as a reflective diffraction grating having a reflection film on the entire surface, at phase steps alternately arranged in the circumferential direction. In FIG. 20, gray portions are concave portions and white portions are convex portions. The phase difference due to the concave portion and the convex portion is designed to be about wavelength/2.

A region A is provided in a region having a width rW0 in the radial direction centered on the reading center radius r0, and slit columns formed by the convex portions and the concave portions that are arranged alternately in the circumferential direction are provided therein. In the region A, an unevenness grating with a period having a width of Tp/6 between boundaries of slits of the concave portion and slits of the convex portion in the radial direction is provided. The grating period in the radial direction is 4 μm.

A region having a radius larger than r0+Wr0/2 includes a region B including a predetermined radius r1. A plurality of slit columns formed by the convex portions and the concave portions that are alternately arranged in the circumferential direction are arranged in the radial direction in the region B. In the slit columns, columns of the convex portions respectively having widths Tw1 and Tw2 in the circumferential direction are disposed alternately adjacent to each other with their grating phases in the circumferential direction differentiated by 180 degrees in the radial direction. In the grating phases arranged alternately in the radial direction, a distance between radial centers of the adjacent grating phases in the radial direction is Rp1, a width of the convex portion and a width of the concave portion in the radial direction is Rs1 and Rm1, respectively.

Similarly, a region having a radius smaller than r0−Wr0/2 includes a region C including a predetermined radius r2, in which a plurality of slit columns formed by the convex portions and the concave portions that are alternately arranged in the circumferential direction are arranged in the radial direction. In the slit columns, columns of the convex portions respectively having widths Tw1 and Tw2 in the circumferential direction are disposed alternately adjacent to each other with their grating phases in the circumferential direction differentiated by 180 degrees in the radial direction. In the grating phases arranged alternately in the radial direction, a distance between radial centers of the adjacent grating phases in the radial direction is Rp2, a width of the convex portion and a width of the concave portion in the radial direction is Rs2 and Rm2, respectively.

The difference from the third embodiment is that a grating duty ratio (a ratio of the width of the convex portion to the width of the concave portion in the circumferential period) is 1:2. That is, the relation of Tw1/Tp=Tw2/Tp=1/3 is satisfied.

In the present embodiment, parameters are as follows.
Wr0=0.12 mm
Tp=2π/1885=0.0033333 rad
Tw1=Tp/3
Tw2=Tp/3
Rp1=9 μm
Rs1=Rp1/2
Rm1=Rp1/2
Rp2=9 μm
Rs2=Rp2/2
Rm2=Rp2/2
r0=6 mm
r1=6.1 mm
r2=5.9 mm Also, although a reflective scale is used in the present embodiment, the present invention is not limited thereto and it may be formed into a transmissive type. In that case, the reflective film may be eliminated, a stepped structure with a transparent base material may be formed, and the phase difference due to the refractive index difference between air and the transparent base material may be set to be λ/2.

In the present embodiment, the grating duty is set to 1:2 in the regions B and C, so that 3rd-order diffracted light in the circumferential direction included in the diffracted light in the radial direction can be reduced. In addition, by using the unevenness grating with the period having the width of Tp/6 between boundaries of slits of the concave portion and slits of the convex portion in the region A in the radial direction, 3rd-order diffracted light in the circumferential direction contained in the component that is not diffracted in the radial direction can be reduced. In this way, it is possible to inhibit a fluctuation of the signal amplitude with respect to a gap change.

Fifth Embodiment

Figure 21:
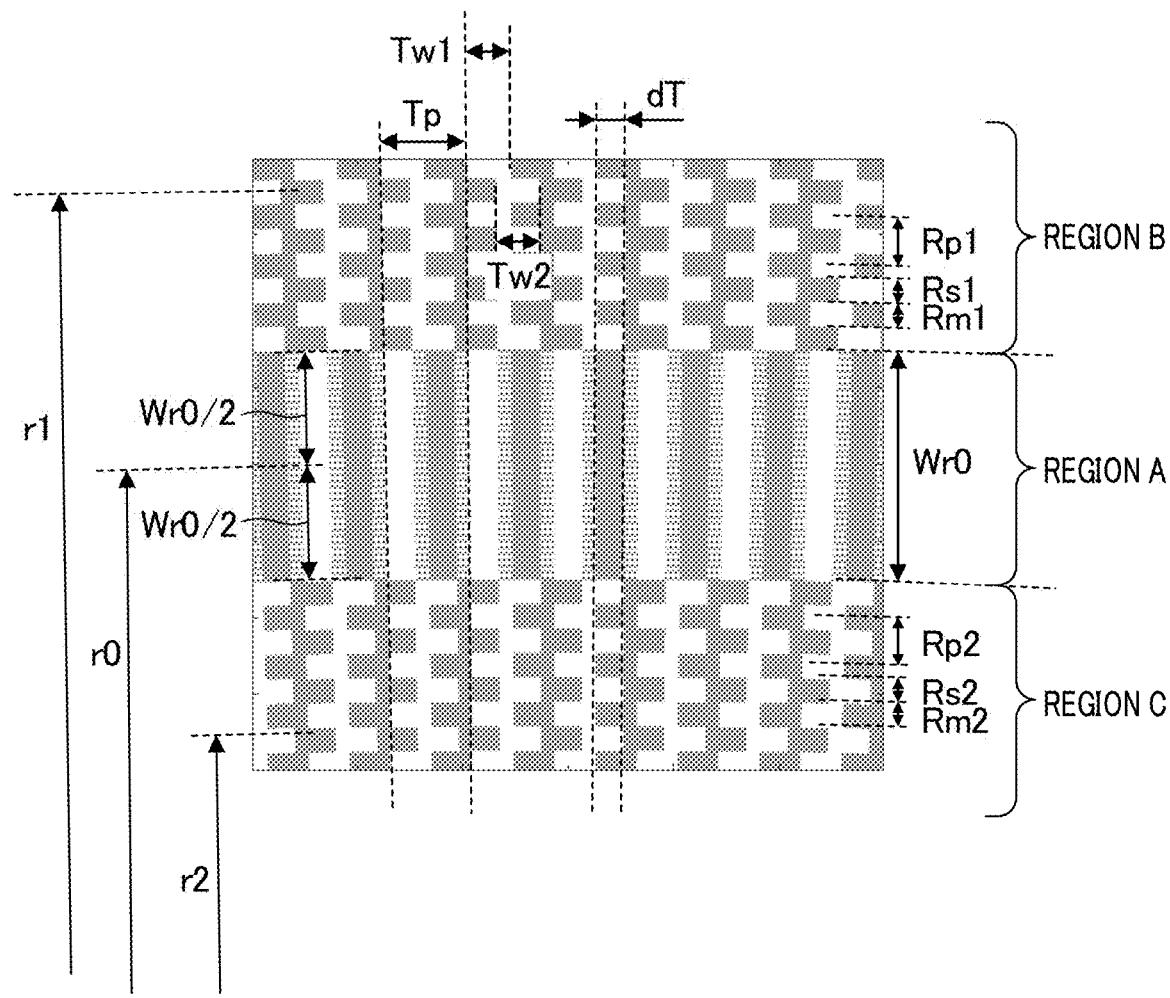
FIG. 21 is a diagram showing an example of a grating pattern according to a fifth embodiment.

FIG. 21 is a diagram showing an example of the grating pattern 21 according to a fifth embodiment. The scale 20 in the present embodiment is provided with a grating pattern 21, which is formed as a reflective diffraction grating having a reflection film on the entire surface, at phase steps alternately arranged in the circumferential direction. In FIG. 21, gray portions are concave portions and white portions are convex portions. The phase difference due to the concave portion and the convex portion is designed to be about wavelength/2.

A region having a radial width rW0 centered on the reading center radius r0 includes a region A, and slit columns formed by the convex portions and the concave portions arranged alternately in the circumferential direction are provided. The slit columns in the region A are the same as those of the fourth embodiment.

A region having a radius larger than r0+Wr0/2 includes a region B including a predetermined radius r1. In the region B, a plurality of slit columns formed by the convex portions and the concave portions alternately arranged in the circumferential direction are arranged in the radial direction. In the slit columns, columns of the convex portions respectively having widths Tw1 and Tw2 in the circumferential direction are disposed alternately adjacent to each other with their circumferential grating phases differentiated by 120 degrees (2π×dT/Tp rad) in the radial direction. In the grating phases arranged alternately in the radial direction, a distance between the radial centers of the grating phases adjacent to each other in the radial direction is Rp1, and a width of the convex portion and a width of the concave portion in the radial direction are Rs1 and Rm1, respectively.

Similarly, a region having a radius smaller than r0−Wr0/2 includes a region C including a predetermined radius r2. A plurality of slit columns formed by the convex portions and the concave portions alternately arranged in the circumferential direction are arranged in the radial direction in the region C. In the slit columns, columns of the convex portions respectively having widths Tw1 and Tw2 in the circumferential direction are disposed alternately adjacent to each other with their circumferential grating phases differentiated by 120 degrees (2π×dT/Tp rad) in the radial direction.

In the grating phases arranged alternately in the radial direction, a distance between the radial centers of the grating phases adjacent to each other in the radial direction is Rp2, and a width of the convex portion and a width of the concave portion in the radial direction is Rs2 and Rm2, respectively.

Figure 22:
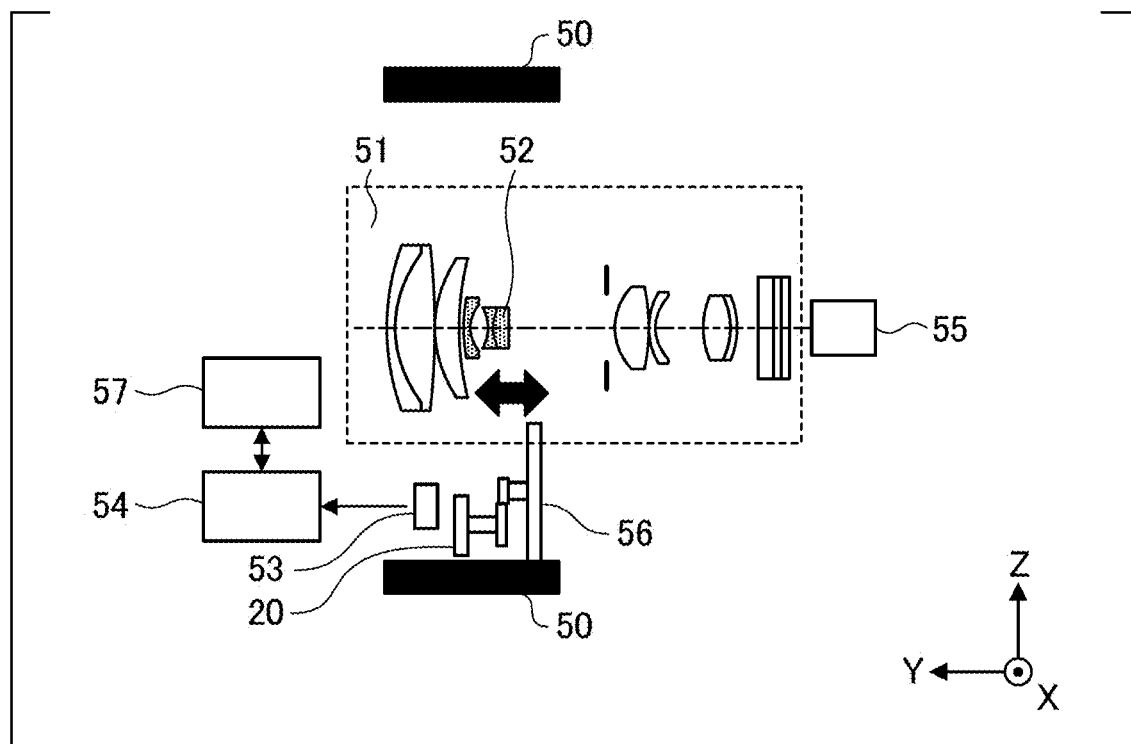
FIG. 22 is a diagram showing a configuration of an imaging device according to a sixth embodiment.

The following parameters are used in the present embodiment.
Wr0=0.12 mm
Tp=2π/1885=0.0033333 rad
Tw1=Tp/2
Tw2=Tp/2
dT=Tp/3
Rp1=9 μm
Rs1=Rp1/2
Rm1=Rp1/2
Rp2=9 sm
Rs2=Rp2/2
Rm2=Rp2/2
r0=6 mm
r1=6.1 mm
r2=5.9 mm Sixth Embodiment The present embodiment is an imaging device in which an encoder is mounted on a lens barrel, and FIG. 22 is a schematic cross-sectional view of the imaging device. In FIG. 22, a reference numeral 53 is a sensor unit, and a reference numeral 54 is a CPU, which functions as a control unit that executes various operations of the entire device on the basis of a computer program stored in a memory 57. These constitute the encoder. Here, the sensor unit 53 functions as the sensor unit 10 according to the first embodiment.

Further, a reference numeral 51 is a lens group, a reference numeral 52 is a drive lens, a reference numeral 55 is an imaging element, and a reference numeral 50 is a cylindrical body, and these constitute an imaging unit. The drive lens 52 constituting the lens group 51 is, for example, an autofocus lens and is displaceable in a Y direction, which is an optical axis direction.

The drive lens 52 is not limited to the autofocus lens and may be any other lens such as a zoom adjustment lens as long as it can be driven and displaced. The cylindrical body 50 in a scale attachment structure according to the present embodiment is connected to an actuator (not shown) that drives the drive lens 52.

The scale 20 is a rotary type scale including a pattern having a radial shape formed on a disk surface and is connected to the cylindrical body 50 via a reduction gear 56. When the cylindrical body 50 is rotated about the optical axis of the lens group 51 by an actuator or manually, the scale 20 is rotationally displaced relative to the sensor unit 53, and thus the drive lens 52 is driven in the Y direction (an arrow direction) which is the optical axis direction.

Then, a signal obtained from the sensor unit 53 of the encoder in response to the displacement of the drive lens 52 is output to the CPU 54. A drive signal for moving the drive lens 52 to a desired position is generated from the CPU 54, and the drive lens 52 is driven on the basis of the signal.

Seventh Embodiment

Figure 23:
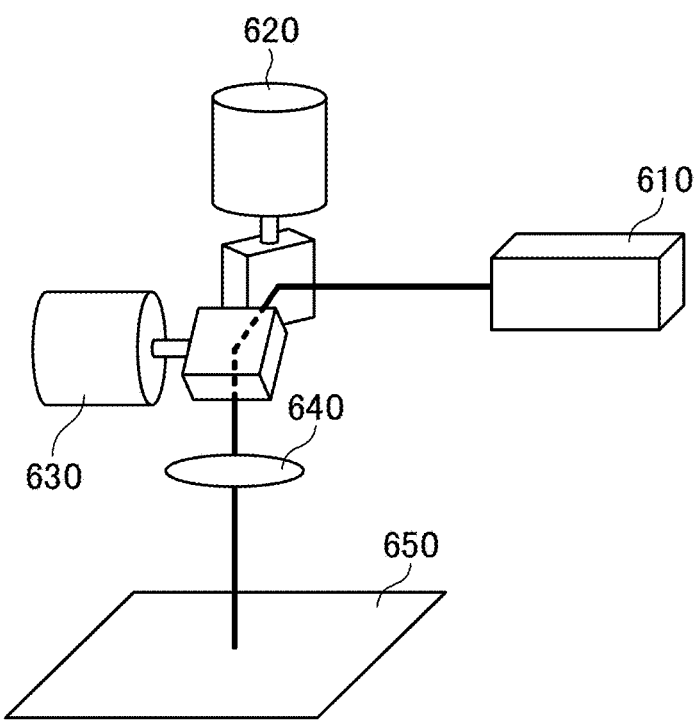
FIG. 23 is a diagram showing a configuration of a laser processing device according to a seventh embodiment.

FIG. 23 is a diagram showing an example of a laser processing device including galvano scanning devices.

Laser light from a laser light source 610 is deflected by galvano scanning devices 620 and 630 in two orthogonal axis directions. The laser light condensed by a lens 640 is radiated to a processing target 650.

Each of the galvano scanning devices 620 and 630 includes a mirror in a rotary movable part and is driven by a motor. An optical encoder including the sensor unit 10 according to the first embodiment is incorporated in each of the galvano scanning devices 620 and 630. In addition, an output of the optical encoder is input to a control unit (not shown) in which a CPU and the like is embedded, and the control unit controls an operation for rotation angle control of the motor and controls the rotation angle and the like.

As described above, according to the present invention, it is possible to obtain the optical encoder in which a position detection can be performed with high resolution. Also, the present invention can be applied to a drive control device using the optical encoder as in the sixth and seventh embodiments. Further, a movable part in the drive control device is not limited to the lens, the mirror and the like as in the sixth and seventh embodiments, and any movable part can be adopted thereto as long as it can be driven and displaced.

That is, it is needless to say that the present invention can be applied to all drive control devices that measure a displacement amount of a movable part using the optical encoder of the present invention and control an operation of the movable part on the basis of the measured displacement amount.

Further, part or all of the control in the present embodiment may be performed by providing a computer program that realizes functions of the embodiments described above to a device using the optical encoder via a network or various storage media. In addition, a computer (or a CPU, MPU, or the like) in a device using the optical encoder may read out and execute the program. In that case, the program and the storage medium storing the program constitute the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-126261 filed on Jul. 5, 2019, and Japanese Patent Application No. 2020-107602 filed on Jun. 23, 2020, which are hereby incorporated by reference herein in its entirety.

What is claimed is:

1. An optical encoder comprising:
   a rotary scale that rotates about a predetermined axis serving as a rotation center and that includes a grating pattern having a first periodic pattern disposed in a first radial region, and a second periodic pattern disposed in a radial region different from the first radial region;
   a light source which irradiates the grating pattern; and
   a light receiving element which detects interference fringes formed by the grating pattern irradiated with light from the light source,
   wherein the light receiving element is configured to receive a first interference fringe formed by the first periodic pattern, second diffracted light which is diffracted by the second periodic pattern in a radial direction from the second periodic pattern toward the first periodic pattern, and
   wherein an optical path length of the second diffracted light from the second periodic pattern to the light receiving element is different from an optical path length from the light source to the second periodic pattern, and an optical path length of the first diffracted light from the first periodic pattern to the light receiving element is the same as an optical path length from the light source to the first periodic.

2. The optical encoder according to claim 1, wherein the light receiving element is disposed to receive a first interference fringe having a period Q1 formed by the first pattern and to receive a second interference fringe having a period Q2 which is diffracted by the second pattern and formed in a direction of the first interference fringe, and is configured to satisfy a relation of $P2 \times Q1/P1 < Q2 < Q1$ or $P2 \times Q1/P1 > Q2 > Q1$.

3. The optical encoder according to claim 1, wherein the light source is disposed to irradiate the grating pattern with the light from a side closer to a center of the rotary scale than the grating pattern.

4. The optical encoder according to claim 1, wherein the light receiving element is disposed to receive a diffracted light from the grating pattern on a side farther from the rotation center of the rotary scale than the grating pattern.

5. The optical encoder according to claim 1, wherein the grating pattern formed in the radial region different from the first radial region includes a grating pattern formed in a second radial region closer to the rotation center of the rotary scale than the first radial region, and a grating pattern formed in a third radial region farther from the rotation center of the rotary scale than the first radial region.

6. The optical encoder according to claim 5, wherein an optical path length of light diffracted from the grating pattern formed in the second radial region to the light receiving element is longer than an optical path length from the light source to the grating pattern formed in the second radial region.

7. The optical encoder according to claim 5, wherein an optical path length of light diffracted from a grating pattern formed in a third radial region to the light receiving element is shorter than an optical path length from the light source to the grating pattern formed in the third radial region.

8. The optical encoder according to claim 1, wherein the light receiving element includes a detection period corresponding to the period of the first interference fringe.

9. The optical encoder according to claim 1, wherein
the light receiving element is configured to receive a first interference fringe formed by the first periodic pattern, second diffracted light which is diffracted toward a direction of the first interference fringe by a periodic pattern of a second radial region closer to a center of the rotary scale than the first radial region, and third diffracted light which is diffracted toward a direction of the first interference fringe by a periodic pattern of a third radial region farther from the center of the rotary scale than the first radial region, and wherein an optical path length of the second diffracted light from the periodic pattern of the second radial region to the light receiving element is longer than an optical path length from the light source to the periodic pattern of the second radial region, and an optical path length of the third diffracted light from the periodic pattern of the third radial region to the light receiving element is shorter than an optical path length from the light source to the periodic pattern of the third radial region.

10. The optical encoder according to claim 1, wherein the first periodic pattern has a first period P1 in a circumferential direction, and the second periodic pattern has a second period P2 different from the first period in a circumferential direction;

wherein the light receiving element is disposed to receive the first interference fringe having a period Q1 formed by the first periodic pattern and to receive a second interference fringe having a period Q2 which is diffracted by the second periodic pattern in a radial direction from the second pattern to the first pattern, and is configured to satisfy a relation of $P2 \times Q1/P1 < Q2 < P1 \times Q1/P2$ in a case where $P2 < P1$, or $P2 \times Q1/P1 > Q2 > P1 \times Q1/P2$ in a case where $P1 < P2$.

11. A drive control device comprising:
an optical encoder;
a movable part which can be driven and displaced; and
a control unit which controls an operation of the movable part using the optical encoder, wherein the optical encoder including:
a rotary scale that rotates about a predetermined axis serving as a rotation center and that includes a grating pattern having a first periodic pattern in a first radial region, and a second periodic pattern disposed in a radial region different from the first radial region, wherein the first periodic pattern is disposed in a first radial region and has a first period P1 in a circumferential direction, and the second periodic pattern is disposed in a radial region different from the first radial region and has a second period P2 different from the first period in a circumferential direction;
a light source which irradiates the grating pattern with light at a predetermined angle; and
a light receiving element which detects interference fringes of the grating pattern irradiated with the light from the light source,
wherein the light receiving element is configured to receive a first interference fringe formed by the first periodic pattern, second diffracted light which is diffracted by the second periodic pattern in a radial direction from the second periodic pattern toward the first periodic pattern, and
wherein an optical path length of the second diffracted light from the second periodic pattern to the light receiving element is different from an optical path length from the light source to the second periodic pattern, and an optical path length of the first diffracted light from the first periodic pattern to the light receiving element is the same as an optical path length from the light source to the first periodic pattern, and
wherein the light receiving element is disposed to receive a first interference fringe having a period Q1 formed by the first periodic pattern and to receive a second interference fringe having a period Q2 which is diffracted by the second periodic pattern and formed in a direction of the first interference fringe, and is configured to satisfy a relation of $P2 \times Q1/P1 < Q2 < Q1$ in a case where $P2 < P1$, or $P2 \times Q1/P1 > Q2 > Q1$ in a case where $P1 < P2$.

* * * * *